(12) United States Patent
Nakajima

(10) Patent No.: US 12,227,938 B2
(45) Date of Patent: Feb. 18, 2025

(54) MOLDED BODY, SOUND ABSORBING MATERIAL, VIBRATION ABSORBING MATERIAL

(71) Applicant: TOSOH CORPORATION, Shunan (JP)

(72) Inventor: Satoru Nakajima, Ayase (JP)

(73) Assignee: TOSOH CORPORATION, Shunan (JP)

( * ) Notice: Subject to any disclaimer, the term of this patent is extended or adjusted under 35 U.S.C. 154(b) by 246 days.

(21) Appl. No.: 17/915,445

(22) PCT Filed: Mar. 29, 2021

(86) PCT No.: PCT/JP2021/013396
§ 371 (c)(1),
(2) Date: Sep. 28, 2022

(87) PCT Pub. No.: WO2021/200870
PCT Pub. Date: Oct. 7, 2021

(65) Prior Publication Data
US 2023/0040730 A1     Feb. 9, 2023

(30) Foreign Application Priority Data

Mar. 30, 2020   (JP) ................. 2020-061081

(51) Int. Cl.
*E04B 1/84*     (2006.01)
*G10K 11/162*   (2006.01)
*B60R 13/08*    (2006.01)

(52) U.S. Cl.
CPC ............. *E04B 1/84* (2013.01); *G10K 11/162* (2013.01); *B60R 13/08* (2013.01)

(58) Field of Classification Search
None
See application file for complete search history.

(56) References Cited

U.S. PATENT DOCUMENTS

| | | | |
|---|---|---|---|
| 4,562,901 A | | 1/1986 | Junger et al. |
| 5,981,046 A | * | 11/1999 | Masui ................. G10K 11/162 |
| | | | 428/297.1 |
| 2005/0126851 A1 | * | 6/2005 | Ikebe .................. G10K 11/162 |
| | | | 181/290 |

FOREIGN PATENT DOCUMENTS

| | | | |
|---|---|---|---|
| JP | H9-114468 A | | 5/1997 |
| JP | 2001335383 A | * | 12/2001 |

(Continued)

OTHER PUBLICATIONS

Hamada, S., Sound Absorbing Material, Dec. 4, 2001, machine translation of JP2001-335383 (Year: 2001).*

(Continued)

*Primary Examiner* — Chinessa T. Golden
(74) *Attorney, Agent, or Firm* — Squire Patton Boggs (US) LLP

(57) ABSTRACT

Disclosed a molded body including: a plurality of cavity portions formed inside a molding material; and a plurality of neck portions provided in each of the plurality of cavity portions and configured to communicate with the cavity portions, wherein some of the plurality of neck portions communicate with a surface and/or the cavity portion exposed on the surface, wherein at least some of the plurality of neck portions cause the plurality of cavity portions to communicate with each other, and wherein an inner surface of the neck portion is formed by the molding material itself.

12 Claims, 20 Drawing Sheets

(56) References Cited

FOREIGN PATENT DOCUMENTS

JP      2008-096637 A      4/2008
JP      2015-116775 A      6/2015

OTHER PUBLICATIONS

International Search Report mailed Jun. 29, 2021 for International Application No. PCT/JP2021/013396, with translation, 5 pages.
International Preliminary Report on Patentability mailed Oct. 13, 2022 for International Application No. PCT/JP2021/013396, with translation, 5 pages.
Extended European Search Report dated Feb. 2, 2024, for European Patent Application No. 21779746.3.

* cited by examiner

Fig.11
(a)
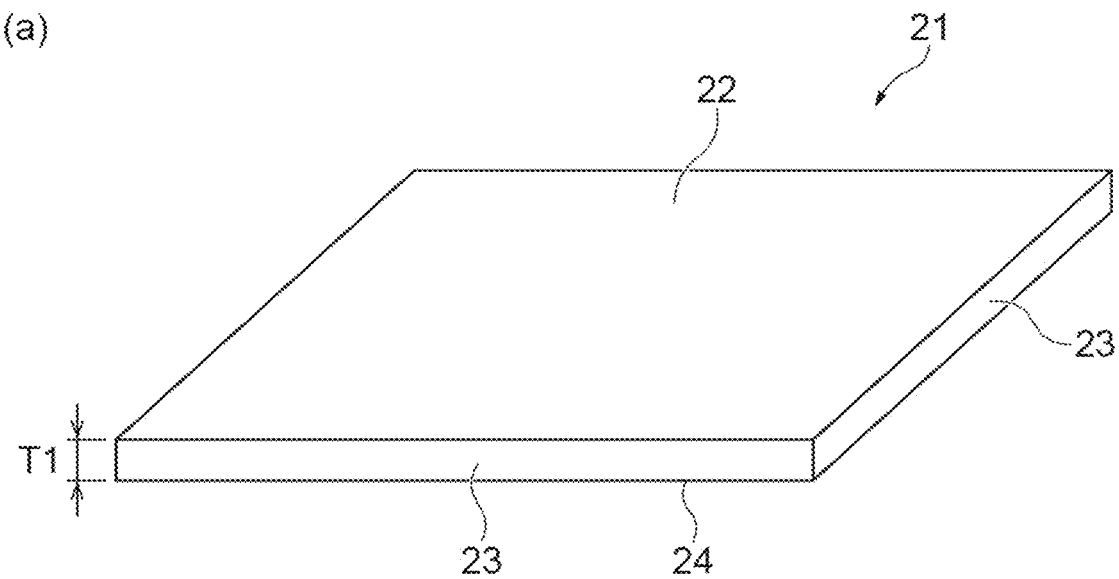
(b)
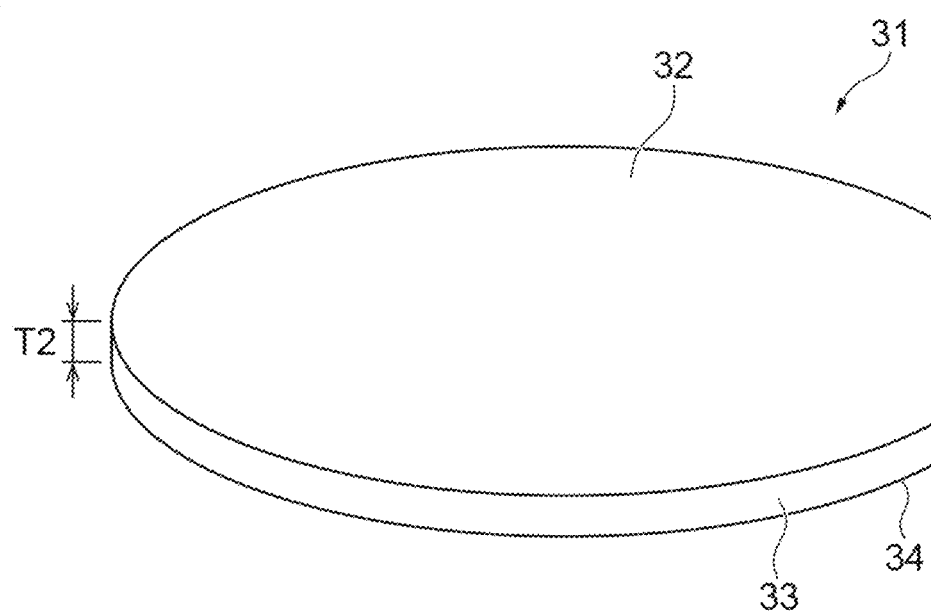

Fig.13
(a)
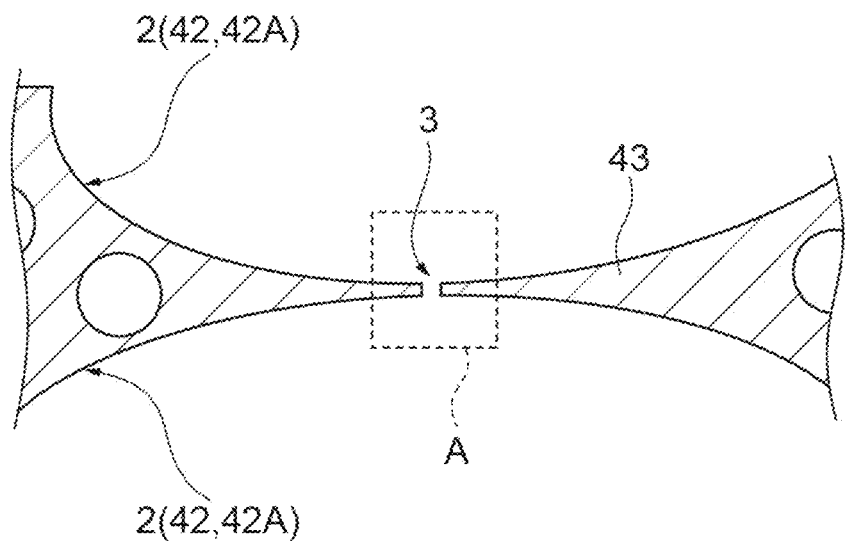
(b)
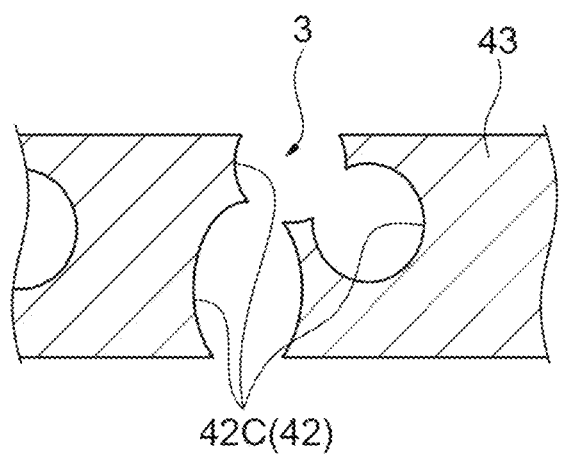

Fig.14
(a)
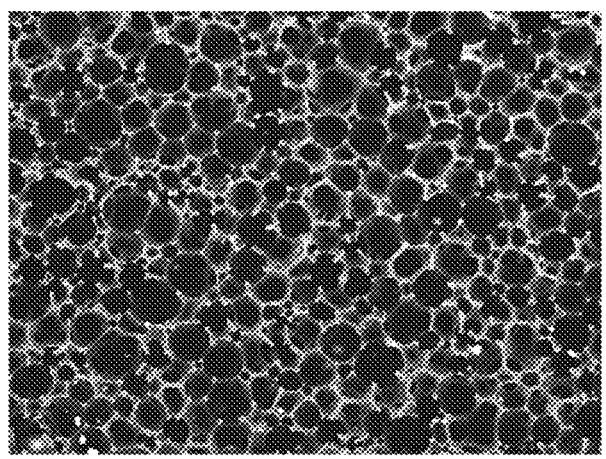
(b)
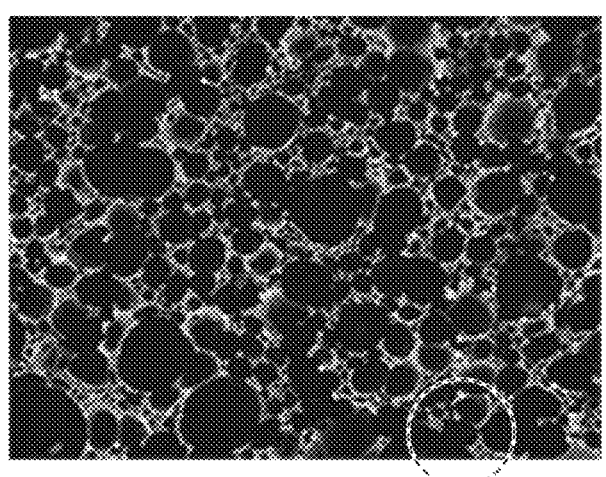
A
(c)
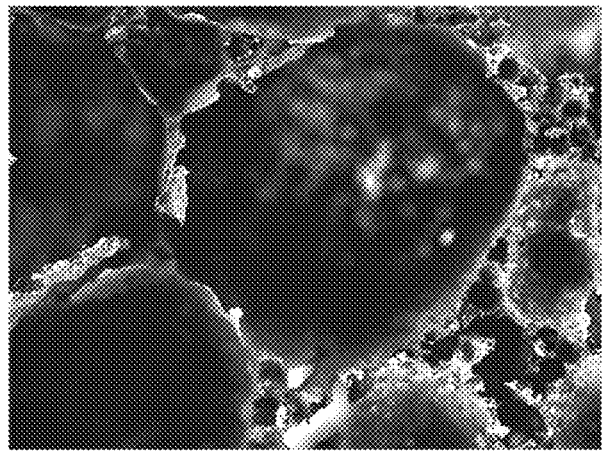

Fig.15
(a)
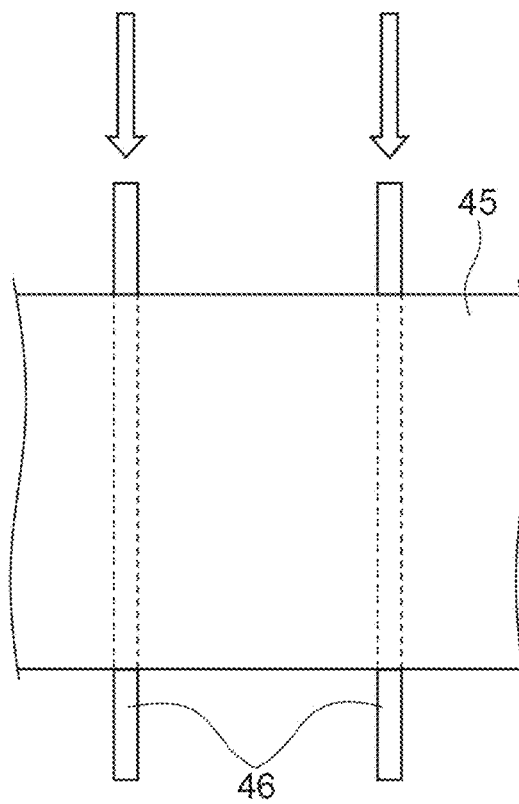
(b)
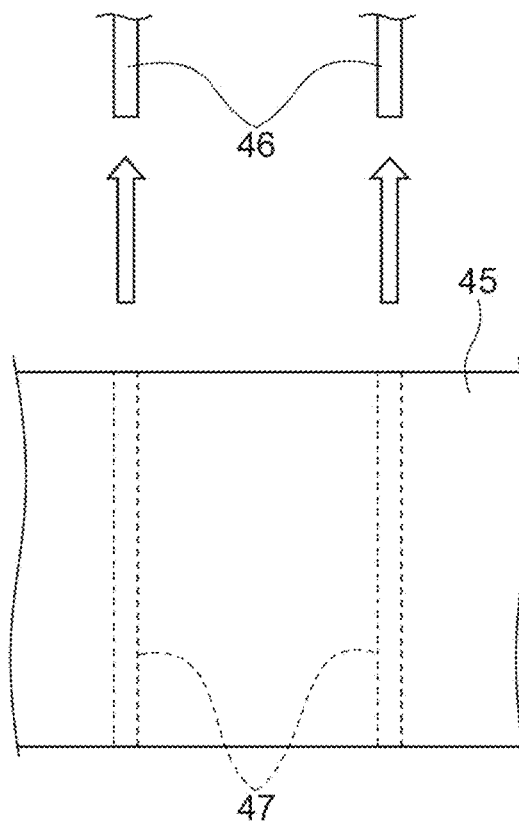

Fig.17
(a)
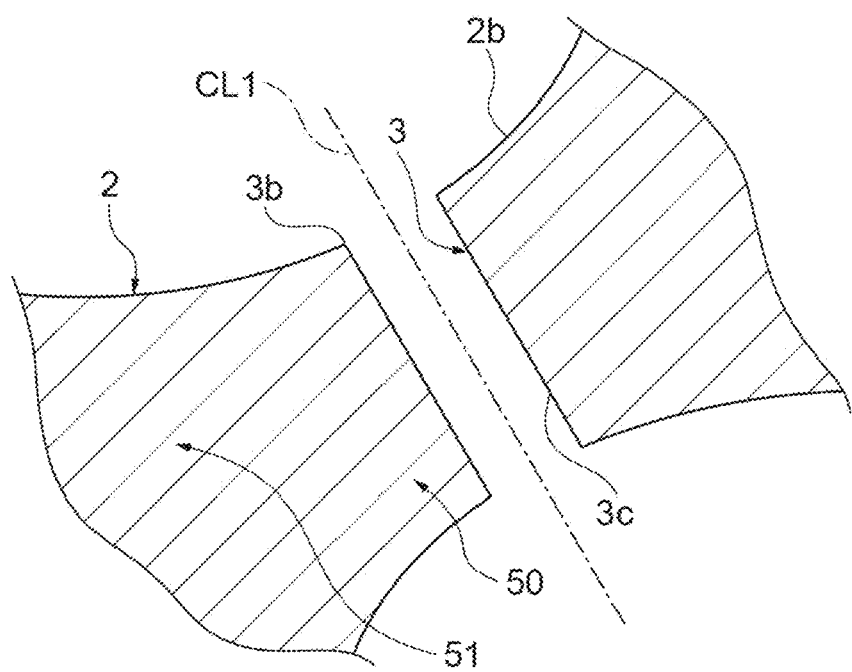
(b)
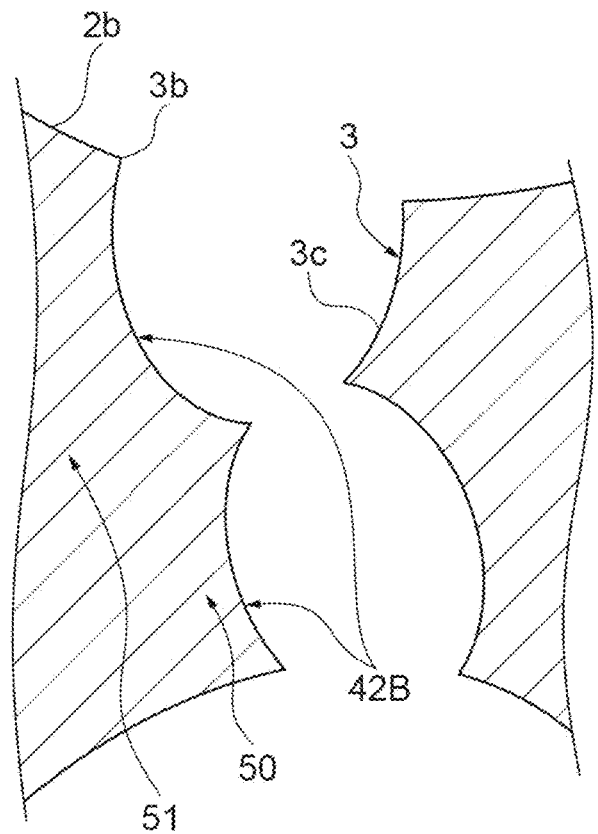

Fig.19
(a)
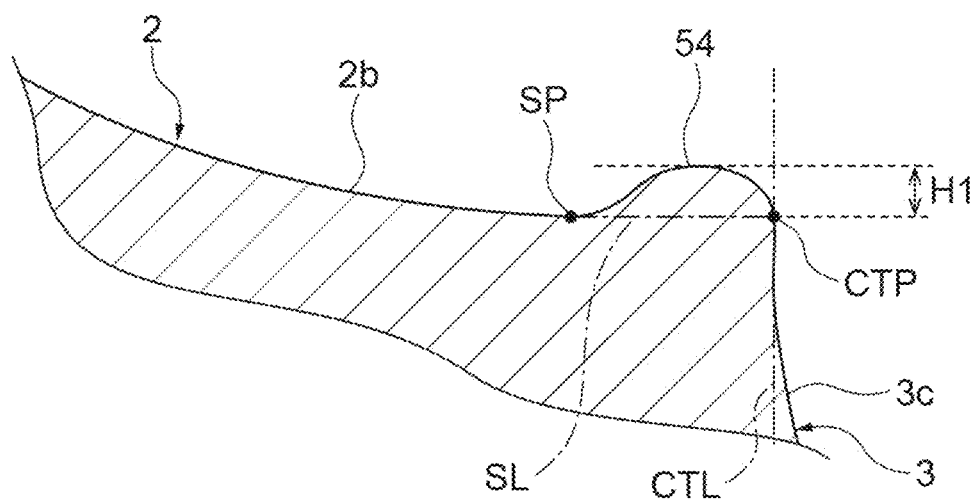
(b)
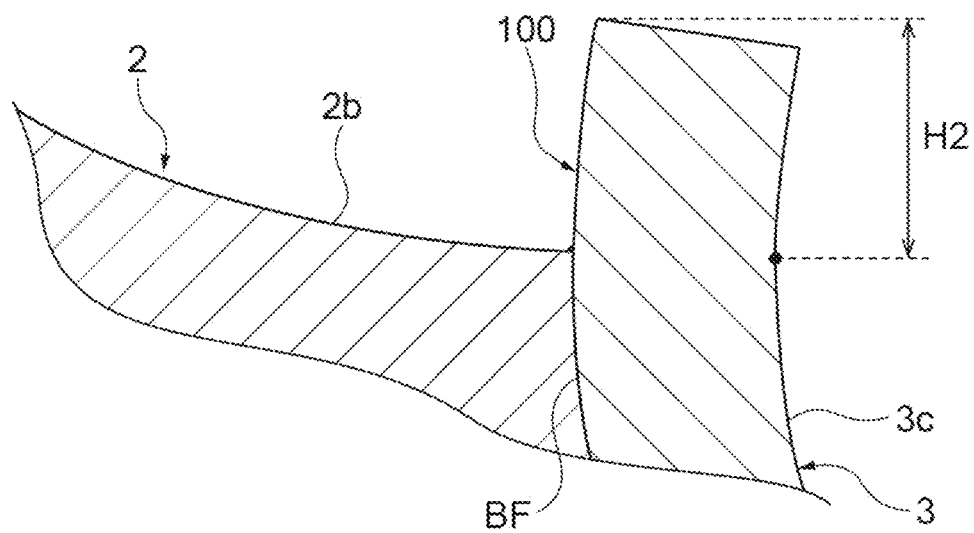

MOLDED BODY, SOUND ABSORBING MATERIAL, VIBRATION ABSORBING MATERIAL

CROSS-REFERENCE

This application is a National Stage filing under 35 U.S.C. § 371 of International Patent Application No. PCT/JP2021/013396, filed Mar. 29, 2021, which claims the benefit of and priority to Japanese Patent Application No. 2020-061081, filed Mar. 30, 2020, the contents of all of which are hereby incorporated by reference in their entireties for all purposes.

TECHNICAL FIELD

The present disclosure relates to a molded body, a sound absorbing material, and a vibration absorbing material.

BACKGROUND ART

Various types of molded bodies are known in the related art. Patent Literature 1 describes a sound absorbing material including a matrix resin forming a base material and a fibrous substance dispersed inside the matrix resin. The matrix resin is constituted by an open cell foamed body containing a thermoplastic resin.

The matrix resin has a plurality of bubbles inside, and the fibrous substance has a hollow portion that causes the plurality of bubbles to communicate with each other. The hollow portion constitutes a sound absorbing mechanism similar to a Helmholtz resonator, and the sound absorbing mechanism absorbs low-frequency sound. The fibrous substance has a curved tubular shape and extends from one bubble to another bubble adjacent to the one bubble. Each of one end and the other end of the fibrous substance protrudes from a bubble wall surface defining the bubble.

CITATION LIST

Patent Literature

[Patent Literature 1] Japanese Unexamined Patent Publication No. 2008-96637

SUMMARY OF INVENTION

Technical Problem

Molded bodies containing the sound absorbing material described above are used in transportation equipment such as automobiles, or in buildings such as houses. However, there is a demand for further noise reduction in molded articles, and the need for noise reduction is increasing. For example, in the field of automobiles, in recent years, stricter noise regulations than before have been formulated, and it is required to further improve sound absorption performance required by the noise regulations. In addition, if a thickness of the molded body increases, it is possible to improve sound absorption performance and vibration absorption performance. However, if the molded body is thick, there is a concern that it will not be possible to secure sufficient space in transportation equipment, buildings, or the like. Therefore, there is a demand for molded bodies that can improve sound absorption performance and vibration absorption performance and curb an increase in size.

An object of the present disclosure is to provide a molded body, a sound absorbing material, and a vibration absorbing material that can improve sound absorption performance and vibration absorption performance and curb an increase in size.

Solution to Problem

According to the present disclosure, there is provided a molded body including: a plurality of cavity portions formed inside a molding material; and a plurality of neck portions provided in each of the plurality of cavity portions and configured to communicate with the cavity portions, wherein some of the plurality of neck portions communicate with a surface and/or the cavity portion exposed on the surface, wherein at least some of the plurality of neck portions cause the plurality of cavity portions to communicate with each other, and wherein an inner surface of the neck portion is formed by the molding material itself.

Advantageous Effects of Invention

According to the present disclosure, it is possible to provide a molded body, a sound absorbing material, and a vibration absorbing material that can improve sound absorption performance and vibration absorption performance and curb an increase in size.

BRIEF DESCRIPTION OF DRAWINGS

FIGS. 11(*a*) and 11(*b*) are perspective views showing contours of exemplary molded bodies.

FIG. 13(a) is an enlarged view showing an example of a rib between a pair of large cells, and FIG. 13(b) is an enlarged view of a portion indicated by "A" in FIG. 13(a).

FIG. 14(a) is a photograph of an observation result of a molded body according to a comparative example, and FIGS. 14(b) and 14(c) are photographs of observation results of a molded body according to an example.

FIGS. 15(a) and 15(b) are schematic views showing a state in which the neck portion is formed by a needle-shaped member being inserted into a foamed body.

FIGS. 17(a) and 17(b) are enlarged cross-sectional views of a molded body schematically showing an example of an internal structure of a molded body.

FIG. 19(a) is a schematic view for explaining a protruding portion of a neck portion of the molded bodies according to the embodiment and the modification example, and FIG. 19(b) is a schematic view for explaining a protruding portion of a neck portion of the molded body according to the comparative example.

DESCRIPTION OF EMBODIMENTS

Figure 1:
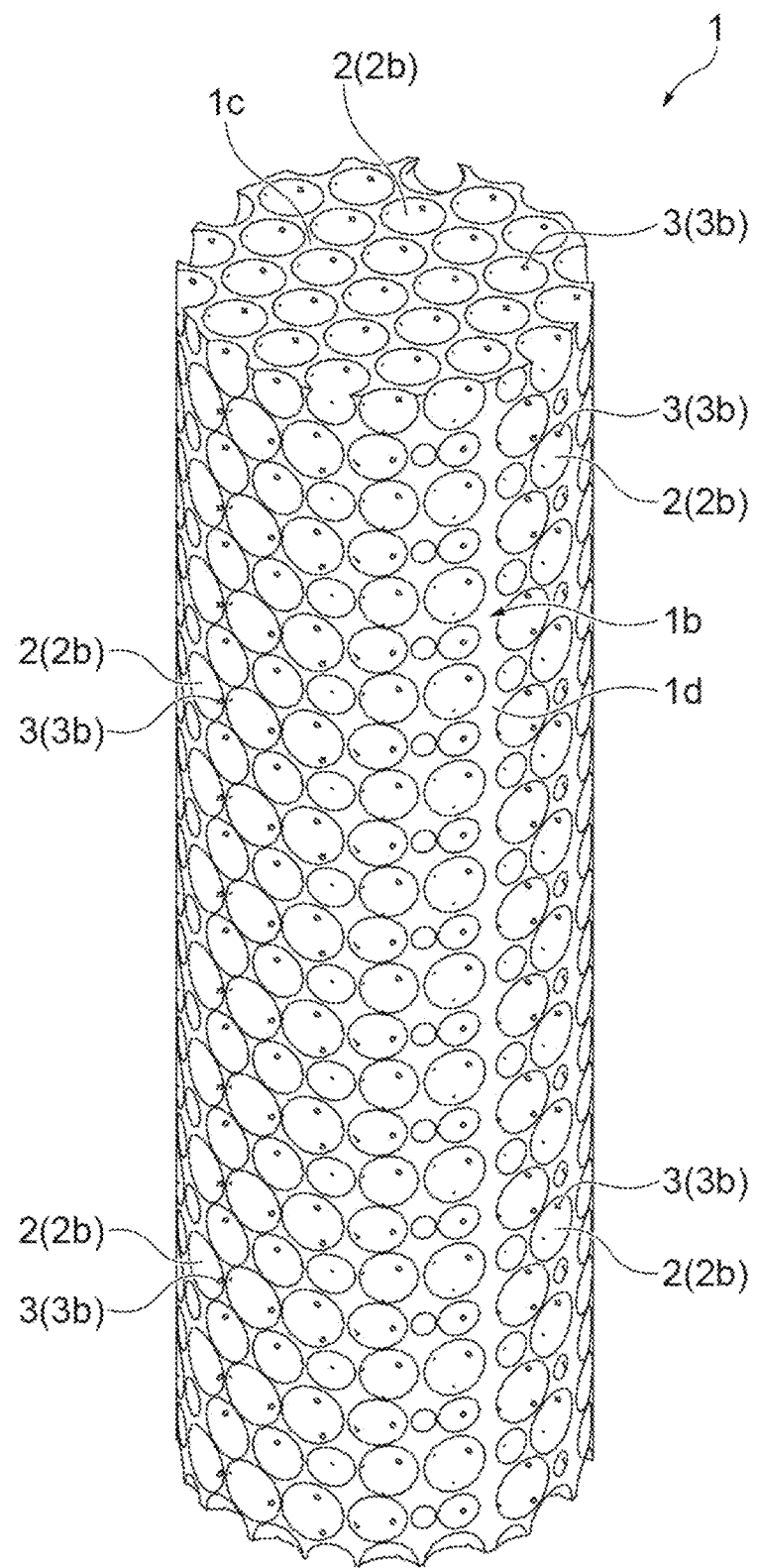
FIG. 1 is a perspective view showing an exemplary molded body according to an embodiment.

In a molded body, a plurality of cavity portions are formed inside, and a neck portion is formed in each of the plurality of cavity portions. Some of the plurality of neck portions communicate with the surface and/or the cavity portions exposed on the surface. At least some of the plurality of neck portions cause the plurality of cavity portions to communicate with each other. Therefore, when vibration energy including sound waves is incident on the neck portion, violent vibration occurs. The cavity portion on a side opposite to the surface functions as a spring, and thus the vibrational energy is viscously attenuated. Therefore, high sound absorption performance and vibration absorption performance can be exhibited by the neck portion and the cavity portion that expands on a side of the neck portion opposite to the surface. In this molded body, the inner surface of the neck portion is formed by the molding material itself. In this case, the incidence of the vibration energy on the cavity portion and the neck portion can be made smoother than in the case where the neck portion is formed by a separate dedicated member. Therefore, sound absorption performance and vibration absorption performance can be improved without increasing the size of the molded body. As a result, it is possible to curb an increase in the size of the molded body.

Further, the cavity portion and the neck portion communicating with the cavity portion may be integrally formed by the same molding material. In this case, the molded body can be manufactured with a single material, and thus the molded body can be easily manufactured.

The molded body may be a foamed body, and the cavity portion may be formed by a cell which is larger than an average diameter of all cells by 100% or more among cells inside the foamed body. In this case, the large cell can form the cavity portion having a sufficient size.

At least some of the neck portions may be formed by the cells inside the foamed body. In this case, the neck portion can be easily formed without using a dedicated member or the like for providing the neck portion.

At least some of the neck portions may have a shape in which a center line extends linearly. In this case, the vibration energy can be smoothly incident on the neck portion.

The plurality of cavity portions and the plurality of neck portions may constitute the wavelength absorbing unit, and the wavelength absorption coefficient of the wavelength absorbing unit at 450 Hz or more and 10000 Hz or less may be 0.4 or more. In this case, the sound wave energy and the vibration energy in a frequency band of 450 Hz or more and 10000 Hz or less can be absorbed with higher efficiency.

The vertical incidence sound absorption coefficient per 10 mm thickness at 450 Hz or more and 10000 Hz or less may be 0.4 or more. In this case, the sound wave energy and the vibration energy in a frequency band of 450 Hz or more and 10000 Hz or less can be absorbed with higher efficiency.

The diameter of the neck portion may be 10 µm or more and 1000 µm or less. In this case, the sound wave energy and the vibration energy in a target frequency band can be absorbed more efficiently.

The volume of the cavity portion may be $4.19 \times 10^9$ µm$^3$ or more and $3.82 \times 10^{11}$ µm$^3$ or less. In this case, the sound wave energy and the vibration energy in a target frequency band can be absorbed more efficiently.

In a case where the protruding portion is formed by the neck portion protruding from the inner surface of the cavity portion, a protruding height of the protruding portion with respect to the inner surface of the cavity portion may be 100 µm or less. In this case, the incidence of the vibration energy on the cavity portion and the neck portion can be made smoother.

The molded body described above may further include: a main surface; a back surface provided to face the main surface; and one or more side surfaces provided between the main surface and the back surface, wherein some of the plurality of neck portions may be exposed on the main surface or the cavity portion exposed on the main surface.

The sound absorbing material according to the present disclosure may be the molded body described above. In this case, it is possible to provide the sound absorbing material having the same operation and effect as described above.

The vibration absorbing material according to the present disclosure may be the molded body described above. In this case, it is possible to provide the vibration absorbing material having the same operation and effect as described above.

The molded body according to the present disclosure includes: a plurality of cavity portions formed inside; and a plurality of neck portions provided in each of the plurality of cavity portions and configured to communicate with the cavity portions, wherein some of the plurality of neck portions communicate with a surface and/or the cavity portion exposed on the surface, wherein at least some of the plurality of neck portions cause the plurality of cavity portions to communicate with each other, and wherein the neck portion extends from an inner surface defining one cavity portion to the surface or an inner surface of another cavity portion adjacent to the one cavity portion.

In the molded body, a plurality of cavity portions are formed inside, and a neck portion is formed in each of the plurality of cavity portions. Some of the plurality of neck portions communicate with the surface and/or the cavity portions exposed on the surface. At least some of the plurality of neck portions cause the plurality of cavity portions to communicate with each other. Therefore, when vibration energy including sound waves is incident on the neck portion, violent vibration occurs. The cavity portion on a side opposite the surface functions as a spring, and thus the vibrational energy is viscously attenuated. Therefore, high sound absorption performance and vibration absorption performance can be exhibited by the neck portion and the cavity portion that expands on a side of the neck portion opposite to the surface. In this molded body, the neck portion extends from the inner surface defining one cavity portion to an inner surface of another cavity portion adjacent to the one cavity portion. Therefore, the neck portion can be formed not to protrude from the inner surface that defines the cavity portion, and thus the incidence of the vibration energy on the cavity portion and the neck portion can be made smoother. Therefore, sound absorption performance and vibration absorption performance can be improved without increasing the size. As a result, it is possible to curb an increase in the size of the molded body.

The material of the cavity portion and the material of the neck portion may be the same. In this case, the molded body can be manufactured with a single material, and thus the molded body can be easily manufactured.

In the molded body described above, the ratio of the number of the neck portions to the number of the cavity portions may be 1.1 or more. In this case, by increasing the proportion of the number of the neck portions, the frictional action between the vibration including sound waves and the neck portions can be strengthened, and thus the sound wave energy and the vibration energy can be absorbed more efficiently.

The molded body described above may contain a urethane foam at least in part. In this case, it is possible to provide the molded body having high flexibility.

The molded body described above may contain at least one of a thermoplastic resin and a photocurable resin. In this case, the molded body can be manufactured by a 3D printer or the like, and thus the molded body can be manufactured more easily.

The air permeability may be 0.4 cm³/(cm²·s) or more and 200 cm³/(cm²·s) or less. In this case, sound absorption performance and vibration absorption performance can be enhanced, and the desired air permeability can be ensured.

The thickness may be 5 mm or more. In this case, sound absorption performance and vibration absorption performance can be enhanced more reliably.

According to the present disclosure, it is possible to provide a molded body, a sound absorbing material, and a vibration absorbing material that can improve sound absorption performance and vibration absorption performance and curb an increase in size.

Description of Embodiments

Hereinafter, embodiments of a molded body, a sound absorbing material, and a vibration absorbing material according to the present disclosure will be described with reference to the drawings. In the description of the drawings, the same or corresponding elements are denoted by the same reference signs, and duplicate description is omitted as appropriate. In addition, the drawings may be partially simplified or exaggerated for easy understanding, and the dimensional ratios and the like are not limited to those described in the drawings.

First, the term "molded body" in the present disclosure indicates a molded article molded into a certain shape. The molded body according to the present disclosure includes a plurality of cavity portions and a plurality of neck portions. In the present disclosure, "cavity portion" indicates a portion forming a space inside the molded body.

The term "neck portion" indicates a portion provided in each of the plurality of cavity portions and communicating with the cavity portion. The "neck portion" may communicate with a surface of the molded body and/or the cavity portion exposed on the surface. The molded body may include a plurality of "neck portions," and at least some of the plurality of neck portions may cause the plurality of cavity portions to communicate with each other. For example, a volume of a void in the "neck portion" may be smaller than a volume of the cavity portion, and the "neck portion" may be a void connecting the plurality of cavity portions to each other.

In the present disclosure, a "wavelength absorbing unit" can be formed by the cavity portion and the neck portion. The term "wavelength absorbing unit" indicates a portion capable of selectively absorbing sound or vibration at a specific wavelength and constitutes, for example, a resonator-type sound absorbing material. The term "resonator-type sound absorbing material" indicates the molded body that absorbs sound at a desired frequency (hereinafter also referred to as a "target frequency") with a hole (for example, the neck portion) exposed on a surface of the molded body and an expanded portion (for example, the cavity portion) that is wider than the hole in a portion on a side opposite to the surface of the hole. When sound wave energy at the target frequency is incident on the hole, the sound wave energy vibrates violently in the hole, and air in the expanded portion positioned at the back of the hole functions as a spring to viscously attenuate the sound wave energy, thereby absorbing the sound. The "wavelength absorbing unit" may be, for example, a Helmholtz resonator.

A relationship between the target frequency (a resonance frequency) $f_0$ (Hz), a diameter d (m) of the hole (for example, the neck portion), and a volume V (m³) of the expanded portion (for example, the cavity portion) is shown in equation (1) below. S indicates a cross-sectional area (m²) of an opening exposed on the surface of the molded body, l indicates a thickness (m) of the material, and C indicates a sound speed (m/s).

[Math. 1]

$$f_0 = C/2\pi\sqrt{S/V(l+0.8d)} \quad (1)$$

For example, using the above equation (1), it is possible to effectively absorb sound wave energy and vibration energy at the target frequency.

FIG. 1 is a perspective view showing an exemplary molded body 1. The molded body 1 is, for example, a sound absorbing material that absorbs sound wave energy. For example, the molded body 1 may be a sound absorbing material provided for curbing noise inside automobiles or noise outside automobiles. Further, the molded body 1 may be a sound absorbing material provided for soundproofing of buildings including houses. Thus, the molded body 1 can be used as a sound absorbing material in various applications. Further, the molded body 1 may be a vibration absorbing material that absorbs vibration energy.

As shown in FIG. 1, the molded body 1 has a cylindrical shape. However, the shape of the molded body 1 is not limited to a cylindrical shape and can be changed as appropriate. The molded body 1 is constituted by, for example, an open cell urethane foam. As an example, the molded body 1 may be manufactured through urethane molding.

Further, the molded body 1 may be constituted by a thermoplastic resin or a photocurable resin. In this case, the molded body 1 is manufactured by, for example, a 3D printer, or the like. For example, the molded body 1 may be constituted by polyvinyl chloride or a metal. Further, the molded body 1 may be manufactured by at least one of laser irradiation, insertion of a needle-shaped member, blowing of gas, and mixing of a volatile component. In this way, the material and the manufacturing method for the molded body 1 are not particularly limited. Further, a molded body having a desired size and shape may be obtained by preparing a large molded body and cutting the prepared molded body into pieces.

The molded body 1 includes a plurality of cavity portions 2 and a plurality of neck portions 3. The plurality of cavity portions 2 are disposed dispersedly inside the molded body 1, for example. "A plurality of cavity portions are disposed dispersedly" includes, for example, a state in which a plurality of cavities 2 are arranged in a zigzag pattern in a cut surface of the molded body 1 shown in FIG. 1, a state in which a plurality of cavity portions 2 are arranged in a grid pattern, and a state in which a plurality of cavity portions 2 are arranged concentrically. For example, the cavity portion 2 is exposed on each of an end surface 1c and a side surface 1d of the molded body 1. Further, the cavity portion 2 may be exposed on all surfaces of the molded body 1, may be exposed on some of the surfaces of the molded body 1, or may be exposed on none of the surfaces. Some of the plurality of neck portions 3 may communicate with (be exposed on) a surface 1b of the molded body 1 and/or the cavity portion 2 exposed on the surface 1b. Inside the molded body 1, the cavity portions 2 may be disposed regularly or may be disposed irregularly.

The neck portion 3 has, for example, an opening 3b on an inner surface 2b of the cavity portion 2. The opening 3b has, for example, a circular shape. However, the shape of the opening 3b is not limited to a circular shape, may be an oval shape or the like, and is not particularly limited. The openings 3b of the neck portion 3 may be disposed regularly or may be disposed irregularly on the inner surface 2b.

In the present disclosure, the "inner surface" of the cavity portion indicates a surface on an inner side which defines the cavity portion. The "opening" indicates to an aperture that is exposed outwardly from a surface of something. The inner surface 2b exposed on the surface 1b has, for example, a hemispherical shape. However, the shape of the inner surface 2b is not limited to a hemispherical shape and is not particularly limited. For example, the sizes (the areas) of the plurality of inner surfaces 2b exposed on the surface 1b are different from each other. That is, the magnitudes of the inner surfaces 2b exposed on the surface 1b are different from each other.

Figure 2:
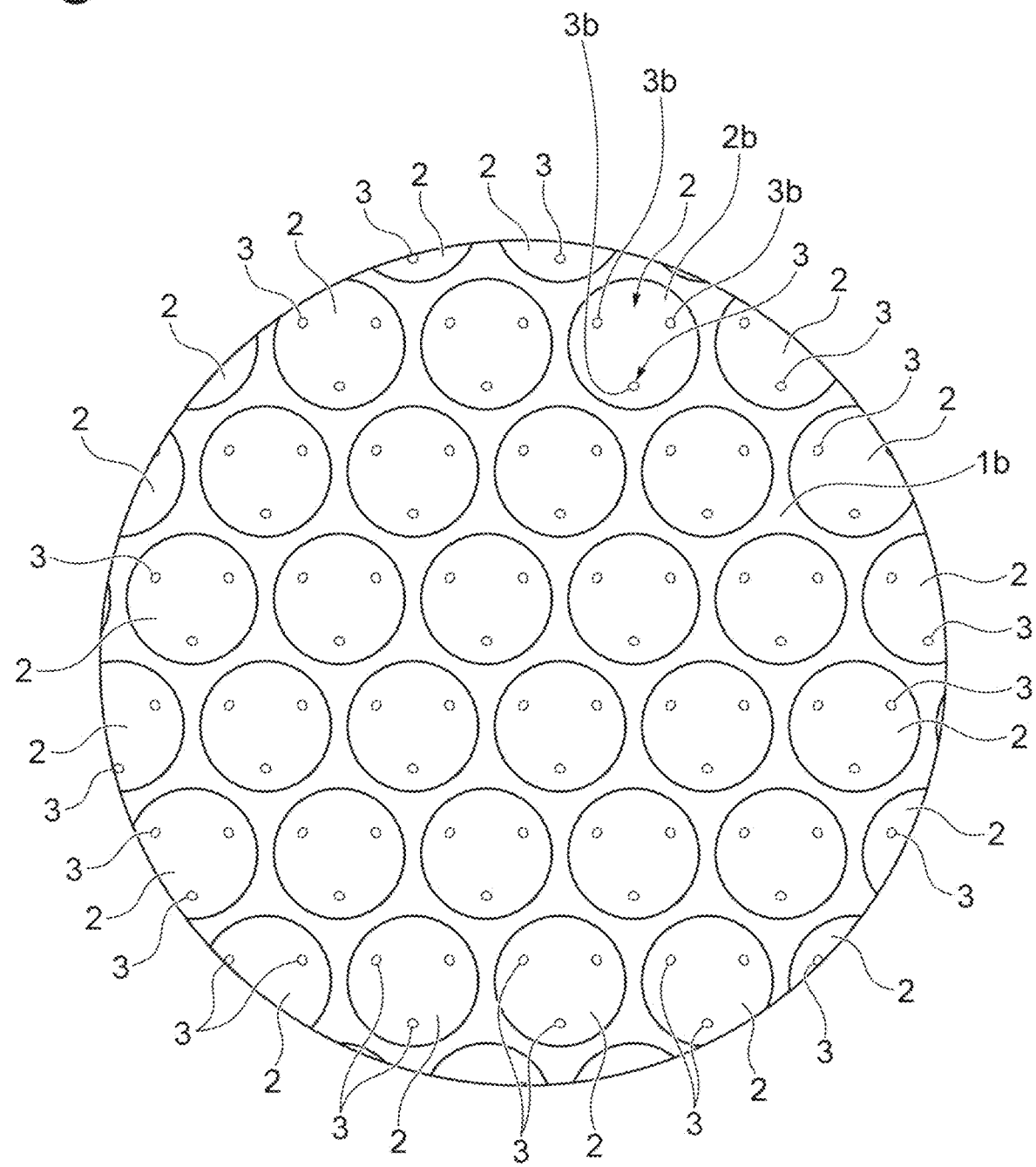
FIG. 2 is a view showing a cavity portion and a neck portion exposed on a surface of the molded body of FIG. 1.

FIG. 2 is a view showing the inner surface 2b of the cavity portion 2 and the opening 3b of the neck portion 3 of the molded body 1. As shown in FIG. 2, the cavity portions 2 may be arranged regularly on the surface 1b and is arranged, for example, in a zigzag pattern. In the example of FIG. 2, three openings 3b are formed in one inner surface 2b.

In the plurality of neck portions 3, diameters of the openings 3b may be identical to each other, for example. However, the diameters of the openings 3b may be different from each other. In a case where the diameters of the openings 3b are different from each other, for example, if a diameter of a first opening 3b is D (mm), a diameter of the second opening 3b may be D/2 (mm), and a diameter of a third opening 3b may be D/4 (mm) As an example, a value of D is 0.4, but the value is not particularly limited.

Figure 3:
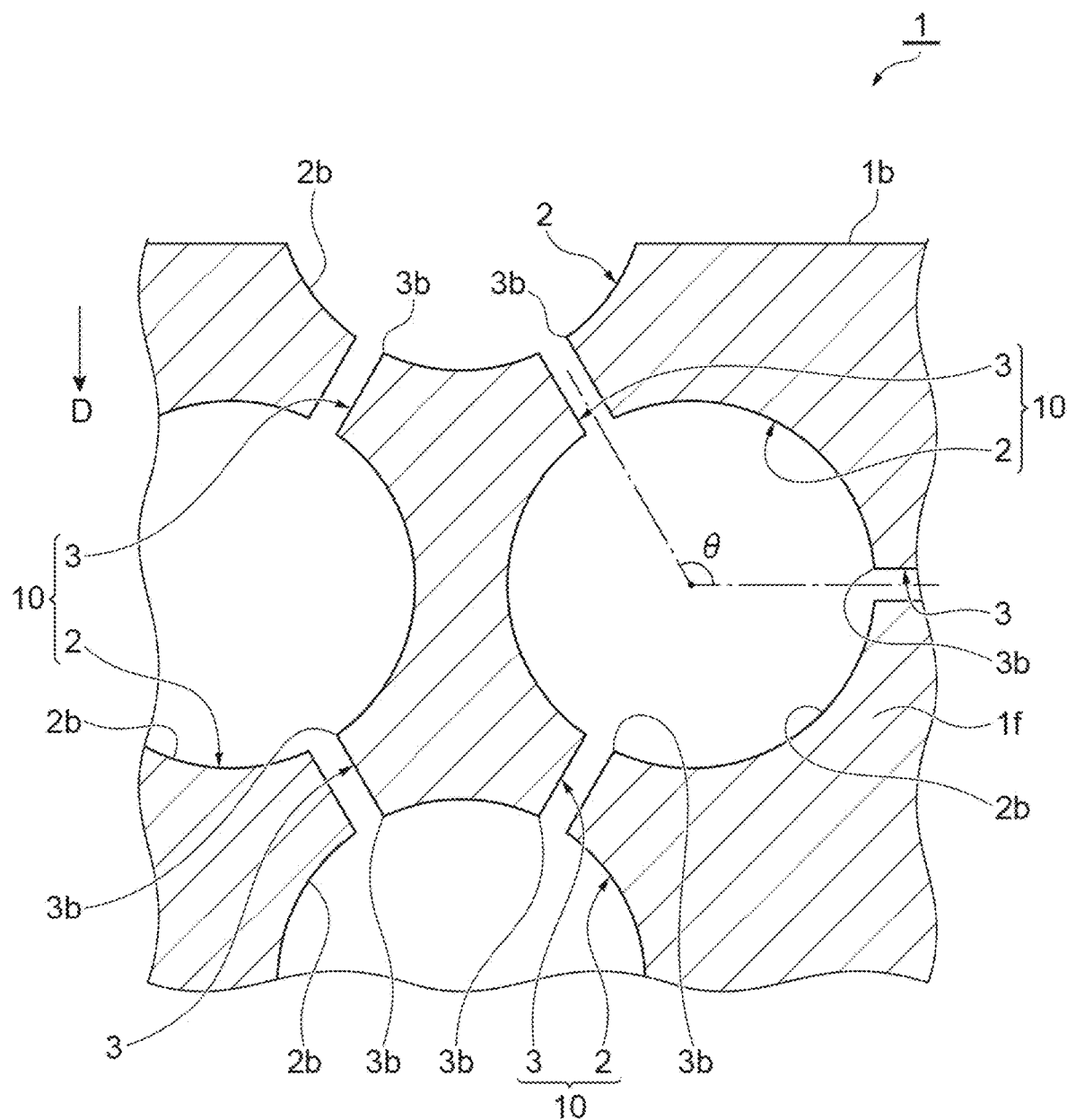
FIG. 3 is a cross-sectional view of a molded body schematically showing an internal structure of the molded body of FIG. 1.

FIG. 3 is a cross-sectional view schematically showing an internal structure of the molded body 1. As shown in FIG. 3, the plurality of cavity portions 2 and the plurality of neck portions 3 that cause the plurality of cavity portions 2 to communicate with each other are formed in an inside 1f of the molded body 1. The neck portion 3 extends from an inner surface 2b defining a cavity portion 2 to an inner surface 2b of another cavity portion 2 adjacent to the cavity portion 2 (which may be an inner surface 2b of a cavity portion 2 exposed on the surface 1b) or the surface 1b (for example, in a case where a cavity portion 2 is formed in the surface 1b, a region other than a region where the cavity portion 2 is formed). For example, the neck portion 3 extends in a manner that an inner surface 2b defining a cavity portion 2 is set as a starting point and an inner surface 2b of another cavity portion 2 adjacent to the cavity portion 2 or the surface 1b is set as an end point. In other words, the neck portion 3 does not extend inside the cavity portion 2. However, on the inner surface 2b of the cavity portion 2, a minute step, a projection, a bulge, or the like that does not significantly impair sound absorption performance and vibration absorption performance may be formed from the neck portion 3 toward the inside of the cavity portion 2. A detailed description of the configuration will be given later while comparing with a comparative example.

As an example, the molded body 1 may be a porous sound absorbing material. In this case, the molded body 1 absorbs sound by converting sound wave energy incident on the neck portion 3 into heat energy. At this time, the sound wave energy is attenuated by friction in the void (the neck portion 3) and is absorbed by skeletal vibration of the molded body 1 itself.

The plurality of cavity portions 2 and the plurality of neck portions 3 may constitute a wavelength absorbing unit 10 of the molded body 1. The wavelength absorbing unit 10 constitutes, for example, a resonator type sound absorbing material. In the wavelength absorbing unit 10, a sound wave or a vibration at the target frequency is absorbed by the neck portion 3 exposed on the surface 1b (the inner surface 2b of the cavity portion 2) of the molded body 1 and the cavity portion 2 wider than the neck portion 3 on a side opposite to the opening 3b of the neck portion 3.

For example, the material of the cavity portion 2 and the material of the neck portion 3 are identical to each other. As a specific example, the material of the cavity portion 2 and the material of the neck portion 3 may contain a thermoplastic resin or a photocurable resin. In this case, the cavity portion 2 and the neck portion 3 can be easily manufactured using a 3D printer or the like.

However, the material of the cavity portion 2 and the material of the neck portion 3 may be different from each other.

In the example of FIG. 3, an example in which the inner surface 2b of the cavity portion 2 is exposed on the surface 1b of the molded body 1 is shown, but the opening 3b of the neck portion 3 may be exposed on the surface 1b of the molded body 1. For example, both the cavity portions 2 and the neck portions 3 are three-dimensionally formed. "Three-dimensionally formed" indicates a state in which, for example, the cavity portions 2 and the neck portions 3 are arranged in each of a first direction of the molded body, a second direction intersecting with (for example, orthogonal to) the first direction, and a third direction intersecting with (for example, orthogonal to) both the first direction and the second direction. In the present embodiment, for example, each of the cavity portions 2 and the neck portions 3 are disposed to line up in one of the first direction, the second direction, and the third direction.

Figure 5:
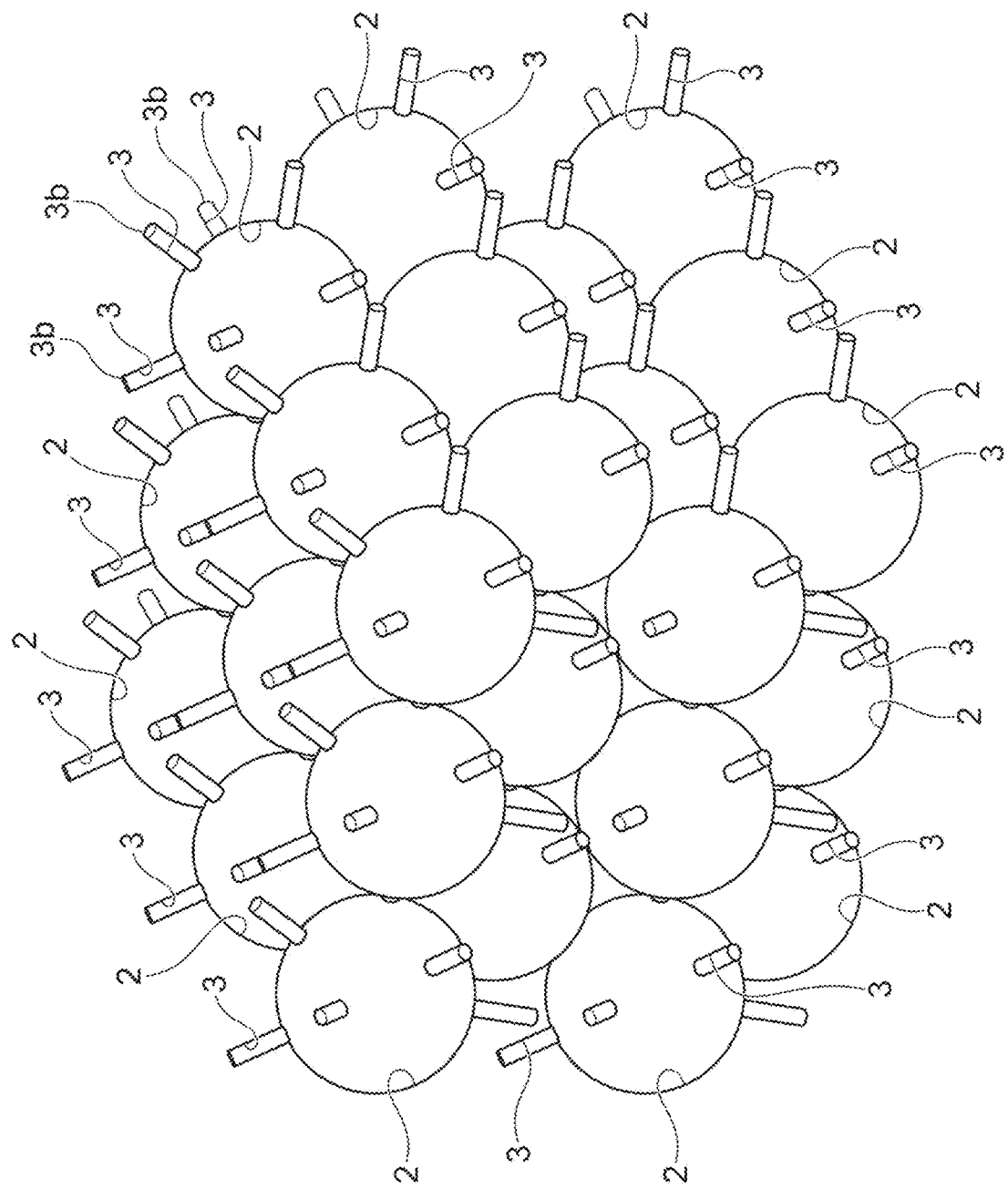
FIG. 5 is a perspective view schematically showing an external appearance of the cavity portion and the neck portion of FIG. 2.

In the example of FIG. 3, each of the cavity portions 2 and the neck portions 3 are disposed to extend in a depth direction D of the molded body 1 and to line up in the depth direction D. FIG. 5 is a perspective view schematically showing an external appearance of the cavity portion 2 and an external appearance of the neck portion 3. As shown in FIGS. 3 and 5, as an example, the inside 1f of the molded body 1, the cavity portion 2 has a spherical shape, and the neck portion 3 has a cylindrical hole shape.

The cavity portion 2 may have a shape other than a spherical shape and may have a rectangular parallelepiped shape, a cubic shape, a polyhedral shape, an egg shape, an ellipsoidal shape, an oval shape, a dome shape, or the like.

The neck portion 3 may have a shape other than the cylindrical hole shape. The neck portion 3 may have any shape as long as it has a void having a volume smaller than that of the cavity portion 2 and has two or more openings communicating with the void. Therefore, the neck portion 3 may have a hollow cylindrical shape (a cylindrical hole shape); a hollow prism shape such as a hollow triangular pillar, a hollow square pillar, and a hollow pentagonal pillar; a hollow truncated cone shape; a hollow truncated pyramid shape such as a truncated triangular cone, a truncated square cone, and a truncated pentagonal cone; a spherical shape; an irregular hollow shape; or the like.

The neck portion 3 may or may not have a curved and bent portion, a flexed and bent portion, a flexed and curved portion, or a curved portion. The neck portion 3 may or may not have branches.

Figure 4:
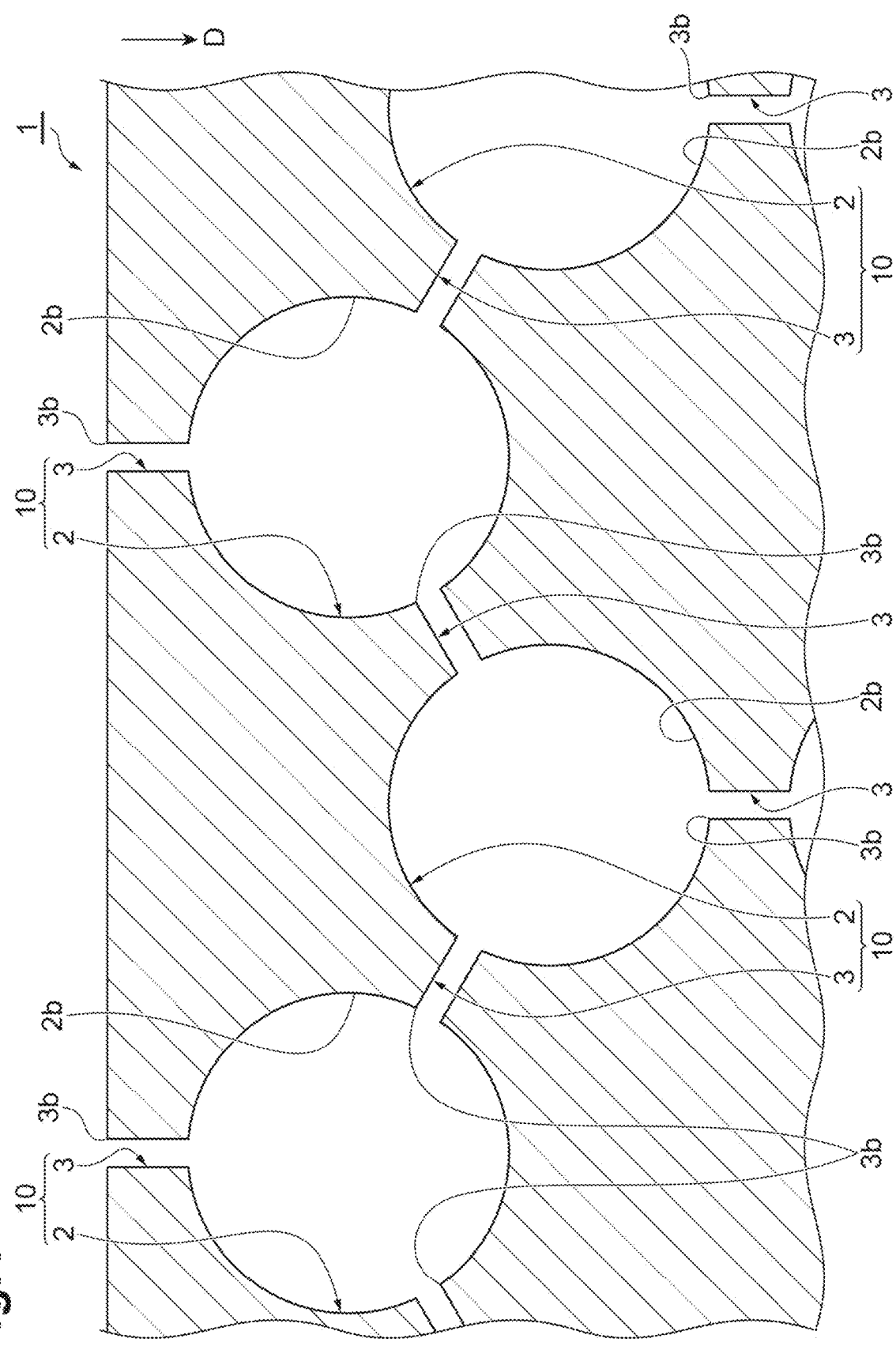
FIG. 4 is a cross-sectional view of a molded body schematically showing an internal structure of an exemplary molded body according to a modification example.

The opening 3b of the neck portion 3 is exposed on the inner surface 2b defining the cavity portion 2, for example. The neck portion 3 extends from an inner surface 2b defining one cavity portion 2 to an inner surface 2b of another cavity portion 2 adjacent to the one cavity portion 2. The sizes of the plurality of neck portions 3 extending from the inner surface 2b may be the same or different from each other. As shown in FIG. 4, the opening 3b of the neck portion 3 may be exposed on the surface 1b of the molded body 1 instead of the cavity portion 2. In this case, one of the plurality of neck portions 3 communicates with the surface 1b of the molded body 1. Further, FIG. 5 shows an example in which the sizes (for example, the diameters) of the plurality of neck portions 3 are the same. However, the plurality of neck portions 3 may include a large neck portion 3, a medium neck portion 3, and a small neck portion 3. In this way, the sizes of the neck portions 3 and the number of types of the sizes of the neck portions 3 can be changed as appropriate.

As an example, the neck portion 3 does not have a portion protruding from the inner surface 2b. Further, the cavity portion 2 may have a hexagonal closest-packed structure. In this case, it is possible to dispose the cavity portions 2 inside the molded body 1 as many as possible, and thus it is possible to further enhance sound absorption performance and vibration absorption performance of the molded body 1.

Further, the plurality of neck portions 3 may radially extend from the spherical cavity portion 2. For example, an angle θ between one neck portion 3 extending from the cavity portion 2 and a neck portion 3 adjacent to the one neck portion 3 is 120°. However, a value of the angle θ is not particularly limited.

Figure 12:
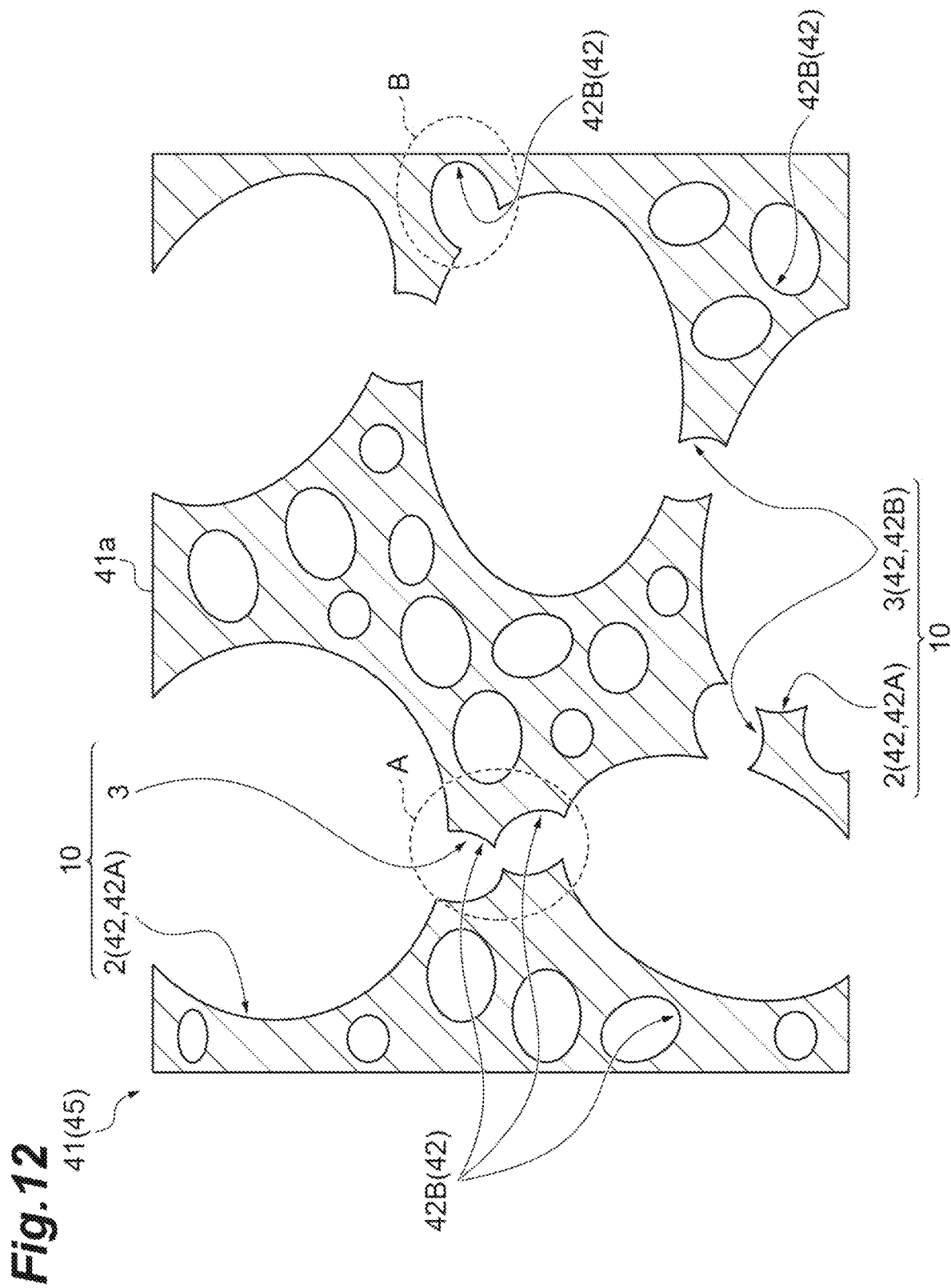
FIG. 12 is a cross-sectional view of a molded body schematically showing an example of an internal structure of a molded body according to a modification example.

Next, with reference to FIG. 12, an example of a configuration in the case where the molded body 41 is a foamed body 45 in which a large number of cells are formed by a molding material being foamed will be described. In this case, a plurality of cells 42 (internal spaces in the molding material) are formed inside a molding resin by bubbles.

The cavity portion 2 is formed by each of some cells of the large number of cells 42 inside the foamed body 45. As shown in FIG. 12, the cavity portion is formed by one large cell 42 (referred to as a large cell 42A). At least each of some of the neck portions 3 is formed by a cell 42 inside the foamed body 45, that is, the neck portion 3 is formed by a cell 42 (referred to as a small cell 42B) smaller than the large cell 42A of the cavity portion 2.

Specifically, in a case where the small cell 42B that is present between one large cell 42A and another large cell 42A communicates with each large cell 42A, the small cell 42B functions as the neck portion 3. Further, as shown by "A" in the figure, a plurality of small cells 42B may communicate with each other to be connected to each other between a pair of large cells 42A. In this way, one neck portion 3 may be formed by the plurality of small cells 42B. In a case where the small cell 42B that is present between one large cell 42A and a surface 41a of the molded body 41 (the foamed body 45) communicates with the large cell 42A and the surface 41a, the small cell 42B also functions as a neck portion. As shown by "B" in the figure, a small cell 42B that communicates with the large cell 42A but does not communicate with another large cell 42A or the surface 41a may be present. In this case, the small cell 42B may function as a part of the volume of the cavity portion 2.

As shown in FIG. 13(a), in a case where adjacent large cells 42A are close to each other, a thin rib 43 is formed. At this time, as shown in FIG. 13(b), fine cells 42C smaller than the small cells 42B may be formed in the thin ribs 43. In a case where a pair of large cells 42A communicate with each other by a set of such fine cells 42C, the neck portion 3 may be formed by the set of the fine cells 42C.

A manufacturing method for forming the cavity portion 2 and the neck portion 3 by mixing the large cells 42A, the small cells 42B, and the fine cells 42C as described above will be described. In this case, the cavity portion 2 and the neck portion 3 are formed by adjustment of an amount of an antifoaming agent to be added when foam molding is performed, for example. That is, the antifoaming agent is mixed in the molding resin of the foam molding and diffused inside the molding material. In a case where the foamed body 45 is molded after the adjustment, portions where bubbles become large are formed due to the influence of the antifoaming agent. As a result, the large cells 42A are randomly formed in a form mixed with the small cells 42B.

Specifically, the antifoaming agent is introduced into the molding resin to join fine bubbles together to form a large bubble capable of forming the large cell 42A. Examples of a method for introducing the antifoaming agent include a method in which the antifoaming agent is introduced into a polyol premix in advance, but the antifoaming agent may also be introduced into an isocyanate side. Examples of the antifoaming agent include an emulsion type in which water is used as a dispersion medium, and an antifoaming agent that cannot be introduced into the isocyanate side can also be employed. As a method for introducing such an antifoaming agent, a method for dripping the antifoaming agent during foaming may be employed in addition to the method described above.

Types of the antifoaming agents can be broadly classified into solvent-based antifoaming agents and water-based antifoaming agents.

Silicon-based antifoaming agents, vegetable oil-based antifoaming agents, polymer-based antifoaming agents, or the like can be employed as the solvent-based antifoaming agents. The effect of the silicon-based antifoaming agents is high. If a raw material of urethane, which is the molding resin, is changed, other types of antifoaming agents may be effective.

For example, in a case where a silicon-based antifoaming agent "GC-302" manufactured by "Nissin Chemical Laboratory" was used, the large cells 42A could be suitably obtained. The large cell 42A was obtained by employing an introduction amount of 0.01% to 0.10% by weight in a system. In a case where the introduction amount is less than 0.01% by mass, the cells may not join together, and thus the large cell may not be obtained. In a case where the introduction amount is more than 0.10% by mass, the cells may collapse, and thus foaming may not occur. Therefore, a urethane foam may not be formed.

FIG. 14 shows a photograph of an observation result of observing the foamed body with a microscope. FIG. 14($a$) shows a foamed body according to a comparative example. FIG. 14($b$) shows a foamed body according to an example. FIG. 14($c$) shows a foamed body according to an example in which the amount of the antifoaming agent increases as compared with FIG. 14($b$). These are images each obtained by capturing a portion of 5.4 mm length×7.2 mm width. As a urethane raw material, which is the molding resin for these foamed bodies, a material that includes an isocyanate-terminated prepolymer, several types of polyoxyethylene polyoxypropylene glycols having different molecular weights, and a polyol premix containing addition agents was adopted. As the antifoaming agent, a silicone antifoaming agent "GC-302" manufactured by "Nissin Chemical Laboratory" was used. In the comparative example of FIG. 14($a$), the introduction amount of the antifoaming agent was set to 0.005% by mass. In the example of FIG. 14($b$), the introduction amount of the antifoaming agent was set to 0.05% by mass. In the example of FIG. 14($c$), the amount of the antifoaming agent introduced was set to 0.08% by mass.

In the comparative example shown in FIG. 14($a$), the cells 42 were not large enough to correspond to the large cells 42A, and no cells 42 that could sufficiently function as the cavity portions 2 could be checked. On the other hand, in the example shown in FIGS. 14($b$) and 14($c$), it can be checked that the large cells 42A which is sufficiently large to be capable of functioning as the cavity portions 2 was obtained. For example, in FIG. 14($b$), a combination of cavity portion 2 and a neck portion 3 of a Helmholtz type can be checked in a portion indicated by "A." Both of FIGS. 14($b$) and 14($c$) simply show a state of one cross-section, and in a three-dimensional view, a structure in which the cavity portion 2 and the neck portion 3 communicate with each other is present at a portion that cannot be checked in the photograph.

Figure 16:
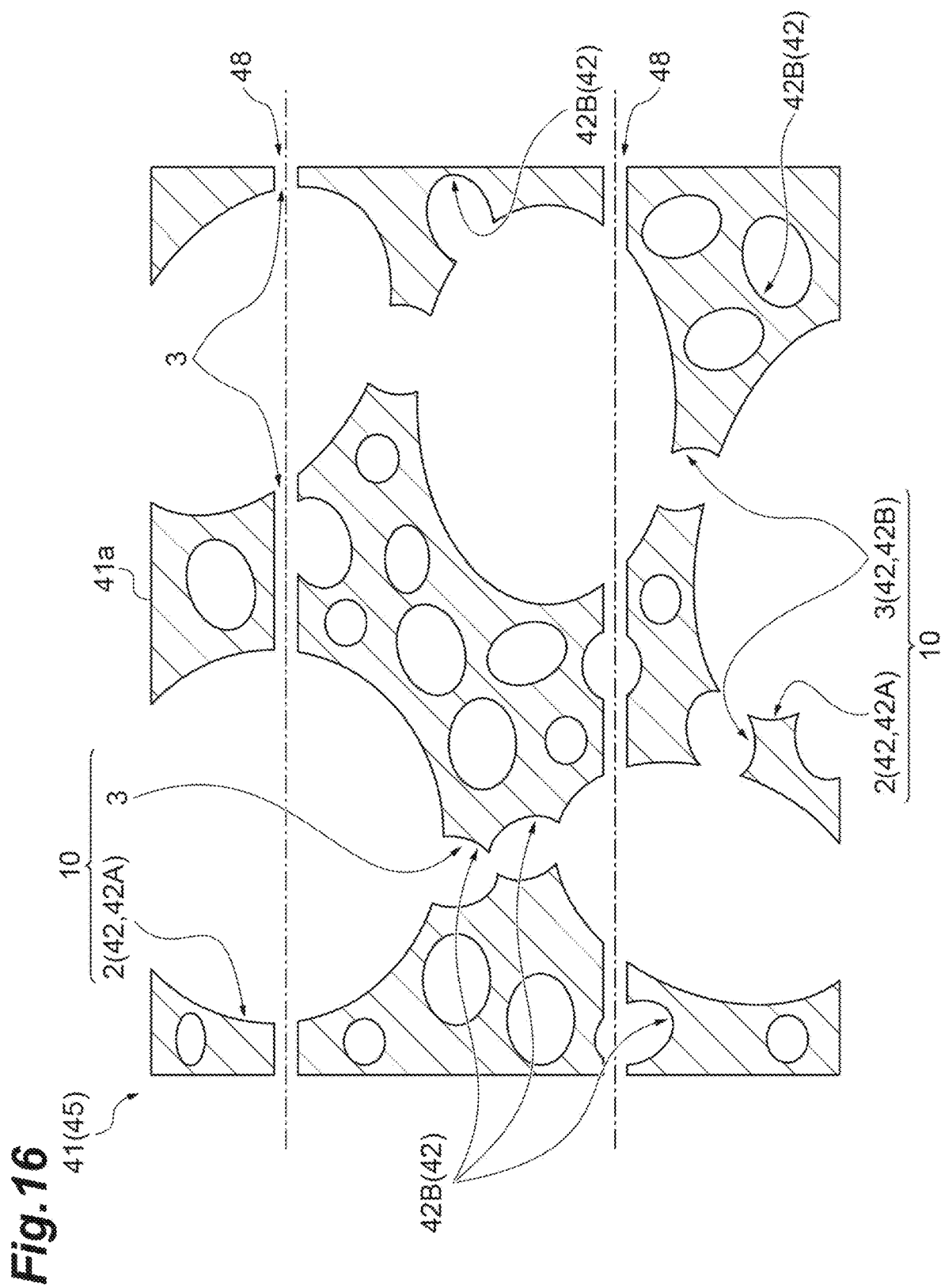
FIG. 16 is a cross-sectional view of a molded body schematically showing an example of an internal structure of a molded body according to a modification example.

Here, the foamed body 45 after molding may be used as a sound absorbing material as it is, or may be processed to form the neck portion 3. For example, laser irradiation, insertion of a needle-shaped member, blowing of gas, mixing of a volatile component, and the like may be performed. For example, as shown in FIG. 15($a$), a needle-shaped member 46 is inserted into the foamed body 45 after molding. Then, as shown in FIG. 15($b$), when the needle member 46 is removed, a hole 47 is formed in the foamed body 45 at a portion where the needle-shaped member 46 has been inserted. As a result, as shown in FIG. 16, a processed portion 48 extending in the foamed body 45 is formed. The processed portion 48 is formed between the pair of cavity portions 2 (large cells 42A) to communicate with both. This portion functions as the neck portion 3 by the processed portion 48. Further, a processed portion 48 that causes the cavity portion 2 (the large cell 42A) to communicate with the surface is formed. Such a portion also functions as the neck portion 3 by the processed portion 48.

Next, with reference to FIGS. 17 to 19, a structure around the cavity portion 2 and the neck portion 3 will be described in more detail. FIG. 17($a$) is an enlarged view of the neck portion 3 in the form shown in FIG. 3 and the neck portion 3 of the processed portion 48 of FIG. 16. FIG. 17($b$) is an enlarged view of the neck portion 3 of the small cell 42B in the form shown in FIG. 12. Here, for comparison with the present embodiment, FIG. 18 shows an enlarged view of the neck portion 3 of the molded body according to the comparative example.

Figure 18:
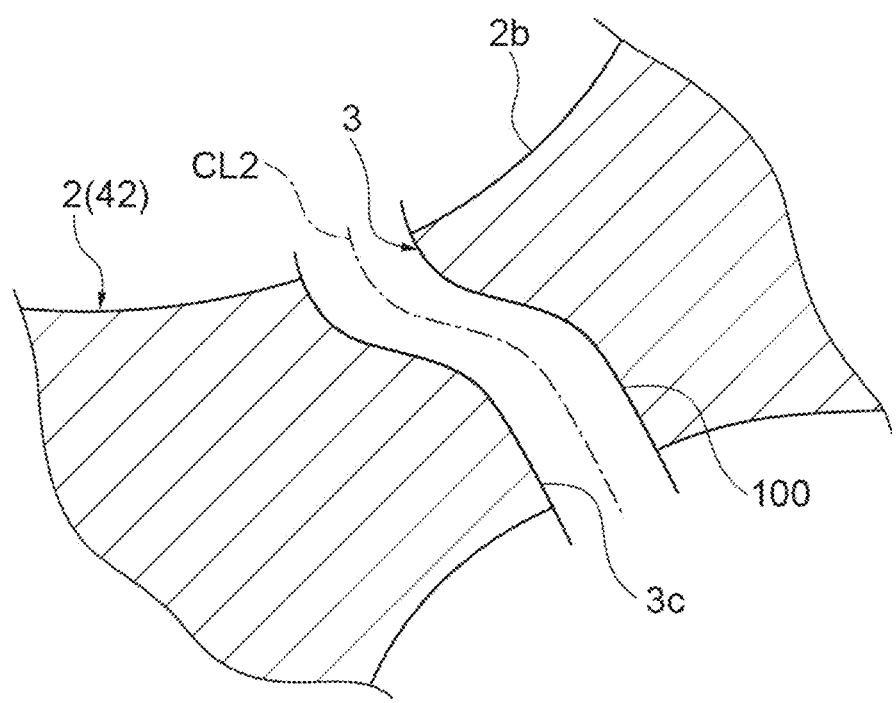
FIG. 18 is an enlarged cross-sectional view of a molded body schematically showing an example of an internal structure of a molded body according to the comparative example.

As shown in FIG. 18, in the molded body according to the comparative example, a communicating member 100 is mixed in the molding material. The communicating member 100 is a material such as a fiber member which is different from the molding material and is formed of a material that remains in a state of maintaining a shape as a member (without disappearing like the antifoaming agent) even after molding. The cells 42 are formed inside the molded body by foaming. Further, when the communicating member is disposed between the pair of cells 42, the pair of cells 42 are in a state of communicating with each other. Thereby, the cell 42 functions as the cavity portion 2, and the communicating member 100 functions as the neck portion 3. In such a configuration, the cavity portion 2 is formed by the molding material, and the inner surface $2b$ of the cavity portion 2 is also formed by the molding material. On the other hand, the neck portion 3 is formed by the communicating member 100, and the inner surface $3c$ of the neck portion 3 is also formed by the communicating member 100 (the inner surface of the communicating member). Further, as shown in FIG. 19($b$), a boundary surface BF is formed in an observable manner between the molding material forming the cavity portion 2 and the communicating member 100 forming the neck portion 3. This state does not correspond to a state in which the material for forming the cavity portion 2 and the material for forming the neck portion 3 are integrally formed with each other. Even if the material of the communicating member 100 is the same as or similar in composition to the molding material, the boundary surface BF is formed. That is, when the communicating member 100 formed in advance is mixed with the molding material and molded, the boundary surface BF remains Even in a case where it is difficult to visually observe this boundary surface BF, it is possible to check the boundary surface BF between the material on a side of the neck portion 3 and the material on a side of the cavity portion 2 because both materials differ in hardness. Therefore, regardless of the composition of the material of the communicating member 100, such a boundary surface BF is formed in an observable manner after molding.

On the other hand, in FIGS. 17($a$) and 17($b$), the inner surface $3c$ of the neck portion 3 is formed by the molding material itself. The molding material 50 that forms the neck portion 3 (the molding material that is present around a space of the neck portion 3) is exposed as it is in the space of the neck portion 3. Further, the cavity portion 2 and the neck portion 3 communicating with the cavity portion 2 are integrally formed by the same molding material. That is, between the molding material 51 that forms the cavity portion 2 (the molding material that is present around a space of the cavity portion 2) and the molding material 50 that forms the neck portion 3 (the molding material that is present around a space of the neck portion 3), the boundary surface BF as shown in FIG. 19($b$) is not present, and the molding material is in a continuous state. An auxiliary agent for forming the neck portion 3 may be used during manufacturing. For example, a capsule that melts due to heat during molding may be used. Such a member is a member included in the molding material because it is absorbed in the molding material by being melted due to heat. The undissolved residue of such a member may remain on the inner surface 3c of the neck portion 3, but such undissolved residue is also a part of the molding material. The communicating member 100 shown in FIG. 18 is not a member that is supposed to be melted due to heat during molding and thus cannot be regarded as a part of the molding material.

Further, in the form shown in FIG. 17(a), the neck portion 3 has a shape in which the center line CL1 extends linearly. On the other hand, in the comparative example, the communicating member 100 is mixed in the molding resin in a fluid state and molded, and thus the communicating member 100 hardens in a randomly curved shape. Therefore, as shown in FIG. 18, the center line CL2 of the neck portion 3 is curved and does not extend linearly. Although FIG. 17(a) illustrates the neck portion 3 having a hollow cylindrical shape (a cylindrical hole shape), it is not particularly limited as long as it is a shape that allows the linear center line CL1 to be set. For example, even if the neck portion 3 has a hollow prism shape such as a hollow triangular pillar, a hollow square pillar, and a hollow pentagonal pillar; a hollow truncated cone shape; a hollow truncated pyramid shape such as a truncated triangular cone, a truncated square cone, and a truncated pentagonal cone; a spherical shape; or the like, the center line CL1 can be linearly extended.

Here, as shown in FIG. 19(b), in the comparative example, the communicating member that forms the neck portion 3 extends greatly inside the cavity portion 2. On the other hand, in the present embodiment, the neck portion 3 does not extend inside the cavity portion 2 as described above. In addition, even if a step, a projection, a bulge, or the like (referred to as a protruding portion 54) is formed as shown in FIG. 19(a), the height of the protruding portion 54 is curbed to a minute height that does not significantly impair sound absorption performance and vibration absorption performance.

Specifically, a protruding height H2 in the comparative example is larger than 100 μm, which is a range that affects the performance. More specifically, if the protruding height H2 in the comparative example is larger than 100 μm and is not secured to about 1 mm, the molding resin will flow into the communicating member 100 and the opening will be blocked with the molding resin. In this case, it is not possible to maintain the open state of the cavity portion 2, and it is not possible to form the neck portion 3 at the beginning.

On the other hand, in the present embodiment, the protruding height H1 of the protruding portion 54 is curbed to 100 μm or less, which is a range that does not affect the performance. More preferably, the protruding height H1 is curbed to 0 μm or more and 80 μm or less. Although the definition of the heights H1 and H2 is not particularly limited, the heights H1 and H2 may be specified using a cross section near the neck portion 3 as follows. First, attention is paid to the vicinity of the opening of the neck portion 3 on the inner surface 2b of the cavity portion 2. In a case where the protruding portion 54 is present, a starting point SP from which the protruding portion 54 rises toward the inside of the cavity portion 2 is present on the inner surface 2b of the cavity portion 2. A reference line SL extends from the starting point SP toward a side of the neck portion 3. At this time, at a contact point CTP where the neck portion 3 is positioned, a tangent line CTL to the contact point CTP is orthogonal to the reference line SL. In a state in which such a relationship is established, a dimension of a portion where the protrusion 54 is highest with respect to the reference line SL is defined as a "height of the protruding portion." However, the definition of the height of the protruding portion 54 is not limited to this, and other known methods may be used. A case where the protruding portion 54 is not formed is a state in which the starting point SP described above is not present (substantially is not present) on the inner surface 2b of the cavity portion 2 near the opening of the neck portion 3.

Next, various parameters of the molded body in each embodiment described above will be described. Each parameter refers to that mentioned in each embodiment of FIGS. 1 to 5 and FIGS. 12 to 19 unless otherwise noted.

Size of Cavity Portion

For example, the diameter of the cavity portion 2 is 2000 μm or more and 9000 μm or less. The upper limit of the diameter of the cavity portion 2 may be 8000 μm, 7000 μm, or 6000 μm. The lower limit of the diameter of cavity portion 2 may be 3000 μm, 4000 μm, or 5000 μm. As an example, the diameter of cavity portion 2 is 5000 μm. However, the diameter of the cavity portion 2 is not limited to 5000 μm and can be changed as appropriate according to the target frequency or the like.

A method for determining the diameters of the cavity portion 2 and the neck portion 3 will now be described. The diameters can be determined by measuring the cavity portion 2 and neck portion 3 from an observation image observed with a microscope. The cavity portion 2 and the neck portion 3 shown in FIG. 16 and the like may not necessarily be a perfect circle in a cross section. In this case, the area of the cavity portion 2 which could be observed in the observation image is calculated. Then, a virtual circle corresponding to the area was drawn, and the diameter of the circle was taken as the diameter of the cavity portion 2. For example, as shown in FIG. 13, in a case where the neck portion 3 is formed by the plurality of cells 42, the total area of the plurality of cells 42 is calculated from the observation image, and the diameter of a circle corresponding to the area is defined as the diameter of the neck portion 3. A method for determining the diameter of one cell is the same as the above method.

For example, the volume of the cavity portion 2 is $4.19 \times 10^9$ μm$^3$ or more and $3.82 \times 10^{11}$ μm$^3$ or less. The upper limit of the volume of the cavity portion 2 may be $2.68 \times 10^{11}$ μm$^3$, $1.80 \times 10^{11}$ μm$^3$, or $1.13 \times 10^{11}$ μm$^3$. The lower limit of the volume of the cavity portion 2 may be $1.41 \times 10^{10}$ μm$^3$, $3.35 \times 10^{10}$ μm$^3$, or $6.54 \times 10^{10}$ μm$^3$. As an example, the volume of the cavity portion 2 is $4.19 \times 10^9$ μm$^3$ or more and $381.51 \times 10^9$ μm$^3$ or less. However, the volume of the cavity portion 2 is not limited to the above example and can be changed as appropriate according to the target frequency or the like.

In a case where the molded body is a foamed body, it is particularly preferable that the following relationship be established. That is, the cavity portion 2 is formed by a cell 42 which is larger than an average diameter of all cells 42 by 100% or more among the cells 42 inside the foamed body and is preferably formed by a cell which is 300% or more or 2200% or more larger than an average diameter of all cells 42. The average diameter is obtained by "(sum of diameters of all cells in a unit volume)/(the number of all cells in a unit volume)." The cells 42 within the unit volume include all of the cell 42 forming the cavity portion 2, the cell 42 forming the neck portion 3, and the cell 42 forming neither the cavity portion 2 nor the neck portion 3. However, the fine cells 42C that have collapsed to such an extent that they cannot be counted may be counted as one cell 42 together.

Size of Neck Portion

For example, the diameter of the neck portion 3 is 10 μm or more and 1000 μm or less. The upper limit of the diameter of the neck portion 3 may be 900 μm, 800 μm or 700 μm. The lower limit of the diameter of the neck portion 3 may be 20 μm, 30 μm or 40 μm. As an example, the diameter of the neck portion 3 is 10 μm or more and 500 μm or less. However, the diameter of the neck portion 3 is not limited to the above example and can be changed as appropriate according to the target frequency or the like.

Relationship Between Cavity Portion and Neck Portion

The number of the neck portions 3 extending from one cavity portion 2 is, for example, 2 or more and 24 or less. The upper limit of the number of the neck portions 3 extending from one cavity portion 2 may be, for example, 15 or 13. The lower limit of the number of the neck portions 3 extending from one cavity portion 2 may be, for example, 3, 4, 5, 6, 8 or 10. As an example, the number of the neck portions 3 is 12. However, the number of the neck portions 3 extending from one cavity portion 2 is not limited to the above example and can be changed as appropriate.

For example, 0 or more and 3 or less openings 3b are formed in the inner surface 2b of the cavity portion 2 exposed on the surface 1b.

Further, the ratio of the number of the neck portions 3 to the number of the cavity portions 2 is, for example, 1 or more and 24 or less. However, the lower limit of the ratio may be 1.1, 3.0, 5.0, 7.0 or 11.0. Further, the upper limit of the ratio may be 20.0, 16.0, 14.0 or 13.0. Thus, the ratio of the number of the neck portions 3 to the number of the cavity portions 2 can be changed as appropriate. In a case where one neck portion 3 is formed by a set of the plurality of small cells 42B or fine cells 42C, the set of the plurality of small cells 42B or fine cells 42C is counted as one neck portion 3. However, it is not necessary to count fine cells that do not function as the neck portion 3.

Air Permeability of Molded Body

The air permeability of the molded body is, for example, 0.4 cm$^3$/(cm$^2$·s) or more and 200 cm$^3$/(cm$^2$·s) or less.

The air permeability was measured using a Frazier type air permeability tester (manufactured by Textest AG, Switzerland) in accordance with JIS K 6400.

Wavelength Absorption Coefficient

The target frequency of the wavelength absorbing unit 10 is, for example, 450 Hz or more and 10000 Hz or less. As an example, the target frequency of the wavelength absorbing unit 10 may be 250 Hz or more and 2000 Hz or less, or 1000 Hz or less. The wavelength absorption coefficient of the wavelength absorbing unit 10 at 450 Hz or more and 10000 Hz or less is 0.4 or more. For example, when sound wave energy at the target frequency is incident on the neck portion 3, the sound wave energy vibrates violently in the neck portion 3, and air in the cavity portion 2 positioned at the back of the neck portion 3 functions as a spring to viscously attenuate the sound wave energy, thereby absorbing the sound.

The wavelength absorption coefficient indicates a proportion at which a wavelength at a specific frequency is absorbed.

A wavelength absorption coefficient of 1.00 means that the incident wave is reflected at 0%, and a wavelength absorption coefficient of 0.00 means that the incident wave is reflected at 100%.

Vertical Incidence Sound Absorption Coefficient

The target frequency of the vertical incidence sound absorption coefficient of the molded body is the same as that mentioned above for the wavelength absorption coefficient. The vertical incidence sound absorption coefficient per 10 mm thickness at 450 Hz or more and 10000 Hz or less is preferably 0.4 or more and is more preferably 0.6 or more. Although the vertical incidence sound absorption coefficient described above is specified as a value per 10 mm of the molded body, the vertical incidence sound absorption coefficient may be specified as a value for the product itself, or as a value per unit thickness in a unit area.

Figure 20:
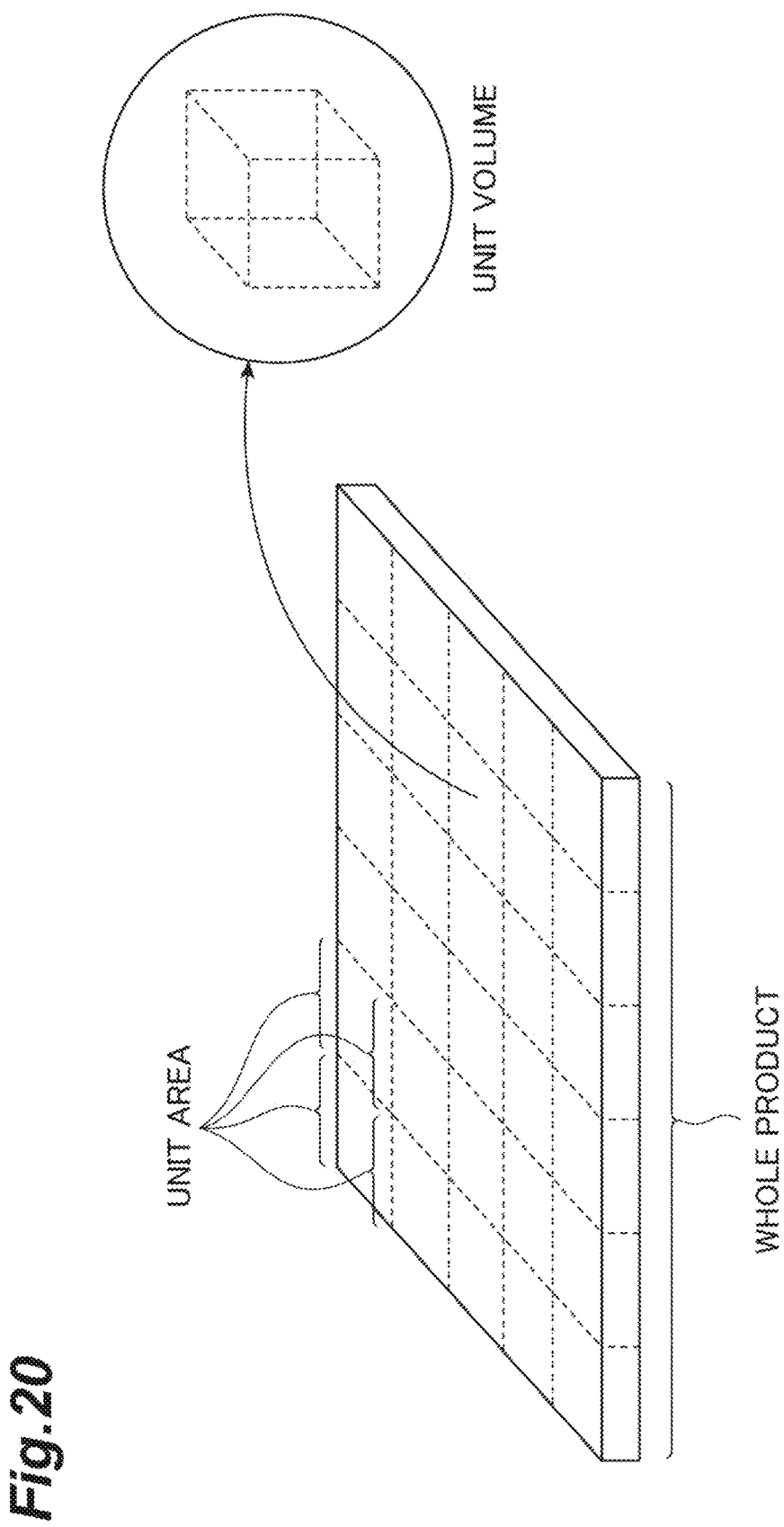
FIG. 20 is a schematic view for explaining a setting range of a parameter.

Here, as shown in FIG. 5, in a case where the cavity portions 2 and the neck portions 3 are regularly disposed, the above-mentioned parameters are substantially uniform over the entire area of a portion in the molded body at which sound absorption performance is exhibited. On the other hand, as shown in FIGS. 12 and 16, in a case in which the cavity portions 2 and the neck portions 3 are formed at random sizes and at random places, each of the above parameters may become random in each region of the molded body. Therefore, the relationship between such a random configuration and the above-mentioned parameters will be described with reference to FIG. 20. At this time, as shown in FIG. 20, in a case where the unit volume is taken out from each position of the sound absorbing material (the molded body), there are parameters that preferably satisfy the conditions in the unit volume at each place. For example, "the size of the cavity portion," "the size of the neck portion," "the relationship between the cavity portion and neck portion," and "the vertical incidence sound absorption coefficient" correspond to such parameters. Further, when an incidence surface of the sound absorbing material is divided into unit areas, there are parameters that may satisfy the conditions in each section. For example, "the vertical incidence sound absorption coefficient" corresponds to one of such parameters. Further, there are parameters that preferably satisfy the conditions for the sound absorbing material (the molded body) as a whole as a product. For example, the above-mentioned "the air permeability" and "the vertical incidence sound absorption coefficient" correspond to such parameters.

Figure 6:
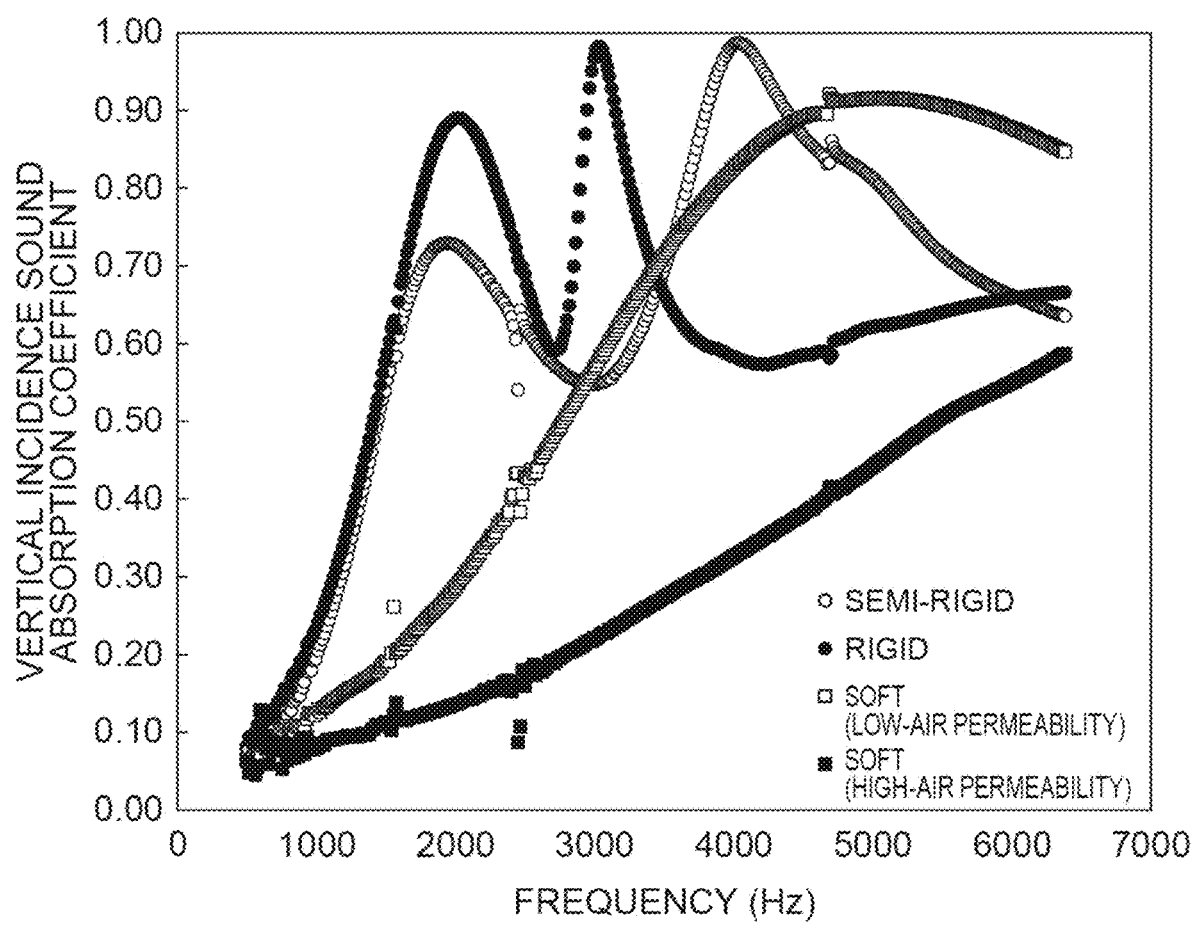
FIG. 6 is an exemplary graph showing a relationship between a frequency of a sound wave with respect to the molded body and a vertical incidence sound absorption coefficient for each material of a urethane foam of the molded body.

Next, verification of the molded body 1 configured as described above will be described. FIG. 6 is an exemplary graph showing a relationship between a frequency of a sound wave incident on a sound absorbing material that does not have the cavity portion 2 and the neck portion 3 and a vertical incidence sound absorption coefficient for each material of the sound absorbing material. FIG. 6 shows the cases where each of semi-rigid urethane, rigid urethane, low-air permeability soft urethane, and high-air permeability soft urethane is used as the sound absorbing material. Also, the vertical incidence sound absorption coefficient indicates an absorption coefficient of the sound wave when the sound wave is applied in a direction perpendicular to a surface of the sound absorbing material. The vertical incidence sound absorption coefficient was measured using a 4206 type acoustic tube (manufactured by Spectris Co., Ltd.) and using vertical incidence sound absorption coefficient measurement software MS1021 (manufactured by Spectris Co., Ltd.) in accordance with JIS A 1405 with a back air layer of 0 mm. From FIG. 6, it can be seen that even if the hardness and the viscoelasticity of the material of the sound absorbing material change, the vertical incidence sound absorption coefficient does not change much (for example, less than 0.6) in a case where the frequency is 2000 Hz or less.

The vertical incidence sound absorption coefficient indicates an absorption proportion of a sound wave at a specific frequency which is vertically incident.

A wavelength absorption coefficient of 1.00 means that the incident wave is reflected at 0%, and a wavelength absorption coefficient of 0.00 means that the incident wave is reflected at 100%.

Figure 7:
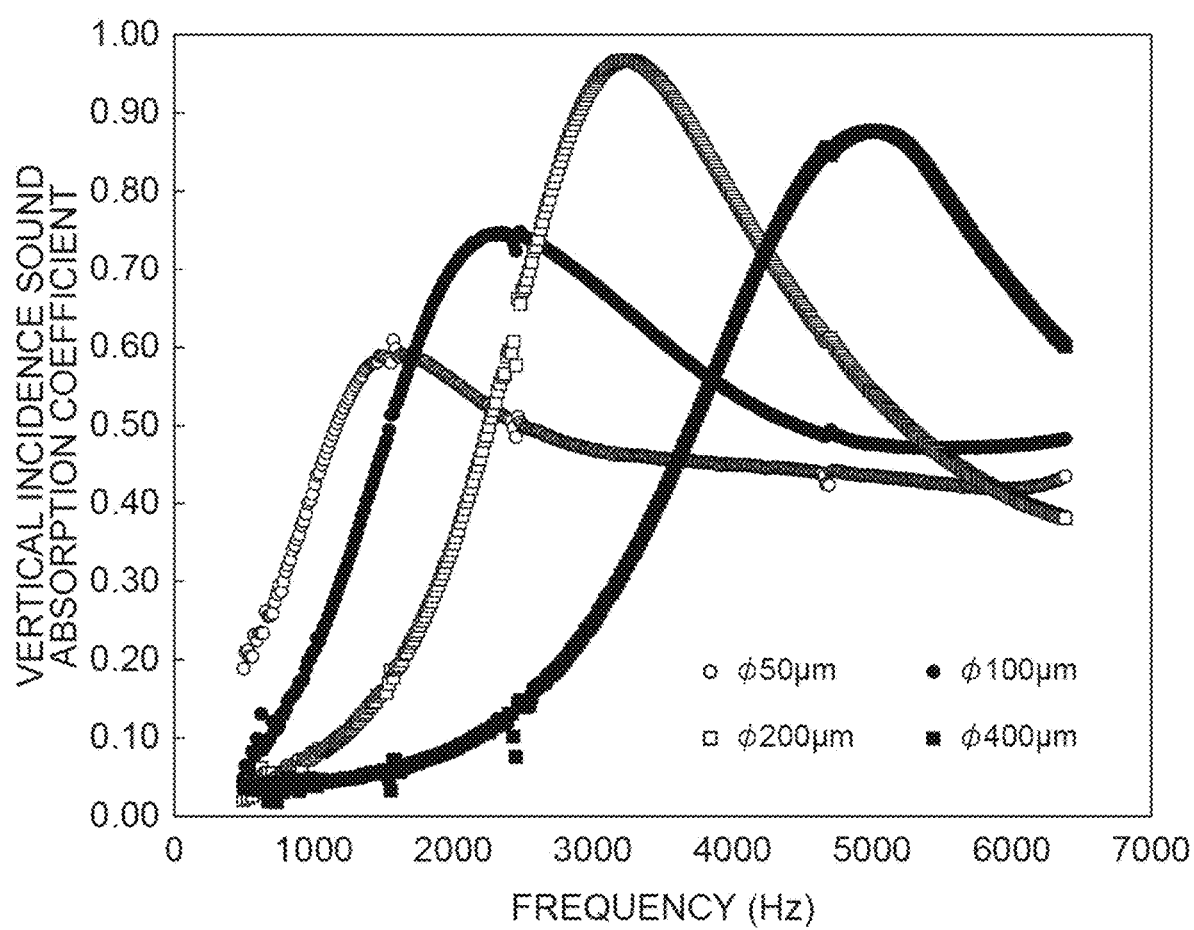
FIG. 7 is an exemplary graph showing a relationship between a frequency of a sound wave with respect to the molded body and a vertical incidence sound absorption coefficient for each diameter of the neck portion.

FIG. 7 is an exemplary graph showing a relationship between a frequency of a sound wave incident on the molded body 1 that has 10 mm thickness and has the cavity portion 2 and the neck portion 3 and a vertical incidence sound absorption coefficient for each diameter of the neck portion 3. FIG. 7 shows the cases where the diameter of the cavity portion 2 is 5000 μm and the diameter of the neck portion 3 is each of 50 μm, 100 μm, 200 μm, and 400 μm.

Figure 8:
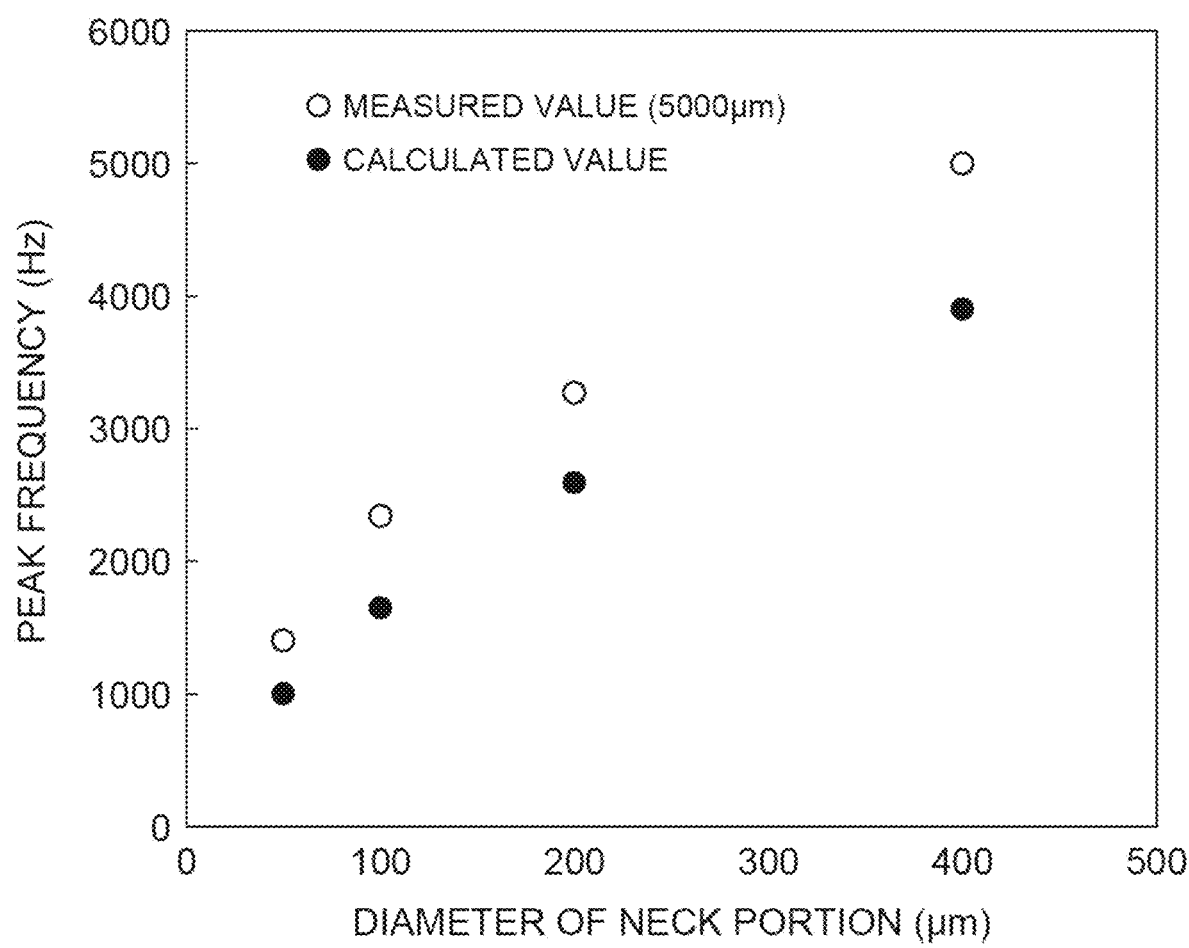
FIG. 8 is an exemplary graph showing a relationship between a diameter of the neck portion and a peak frequency of a sound wave.

FIG. 8 is an exemplary graph showing a relationship between a diameter of the neck portion 3 and a peak value of a frequency with the highest sound absorption coefficient when the thickness of the molded body 1 is 10 mm and the diameter of the cavity portion 2 is 5000 μm. As shown in FIGS. 7 and 8, in the case of the molded body 1 having the cavity portion 2 and the neck portion 3, when the diameter of the neck portion 3 is 50 μm and the diameter of the cavity portion 2 is 5000 μm, it could be seen that it is possible to absorb a sound wave at a frequency around 1000 Hz.

Further, by changing the diameter of the neck portion 3, it was possible to absorb a sound wave at a frequency corresponding to the calculated value of the above-mentioned equation (1). That is, it could be seen that by changing the diameter of the neck portion 3, it is possible to absorb a sound wave at the target frequency in a wide range. In a case where the molded body 1 has open-cell properties, particularly, it is also possible to favorably absorb a sound wave in a wavelength range around the target frequency.

In addition, FIG. 8 shows the measured value and the calculated value when the thickness of the molded body 1 is 10 mm. It could be seen that in a case where the thickness of the molded body 1 is 10 mm, the measured value exceeds the calculated value. However, it could be seen that when the thickness of the molded body 1 is 15 mm, the measured value and the calculated value substantially match.

Figure 9:
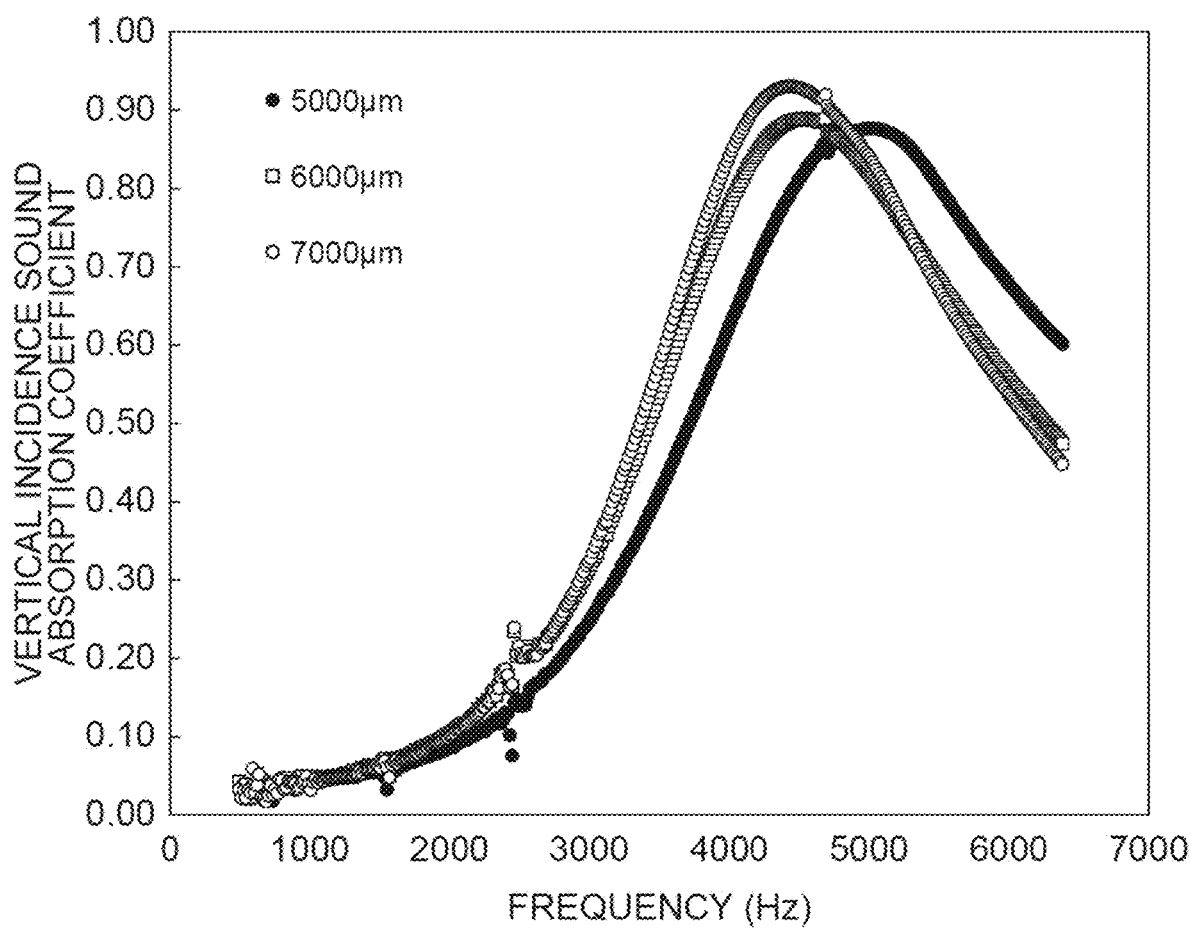
FIG. 9 is an exemplary graph showing a relationship between a frequency of a sound wave with respect to the molded body and a vertical incidence sound absorption coefficient for each diameter of the cavity portion.

FIG. 9 is an exemplary graph showing a relationship between a frequency of a sound wave incident on the molded body 1 that has the cavity portion 2 and the neck portion 3 and a vertical incidence sound absorption coefficient for each diameter of the cavity portion 2. FIG. 9 shows the cases where the diameter of the neck portion 3 is 400 μm and the diameter of the cavity portion 2 is each of 5000 μm, 6000 μm, and 7000 μm. As shown in FIG. 9, it could be seen that even if the diameter of the cavity portion 2 changes in a range of 5000 μm or more and 7000 μm or less, the vertical incidence sound absorption coefficient does not fluctuate as much as when the diameter of the neck portion 3 changes.

Figure 10:
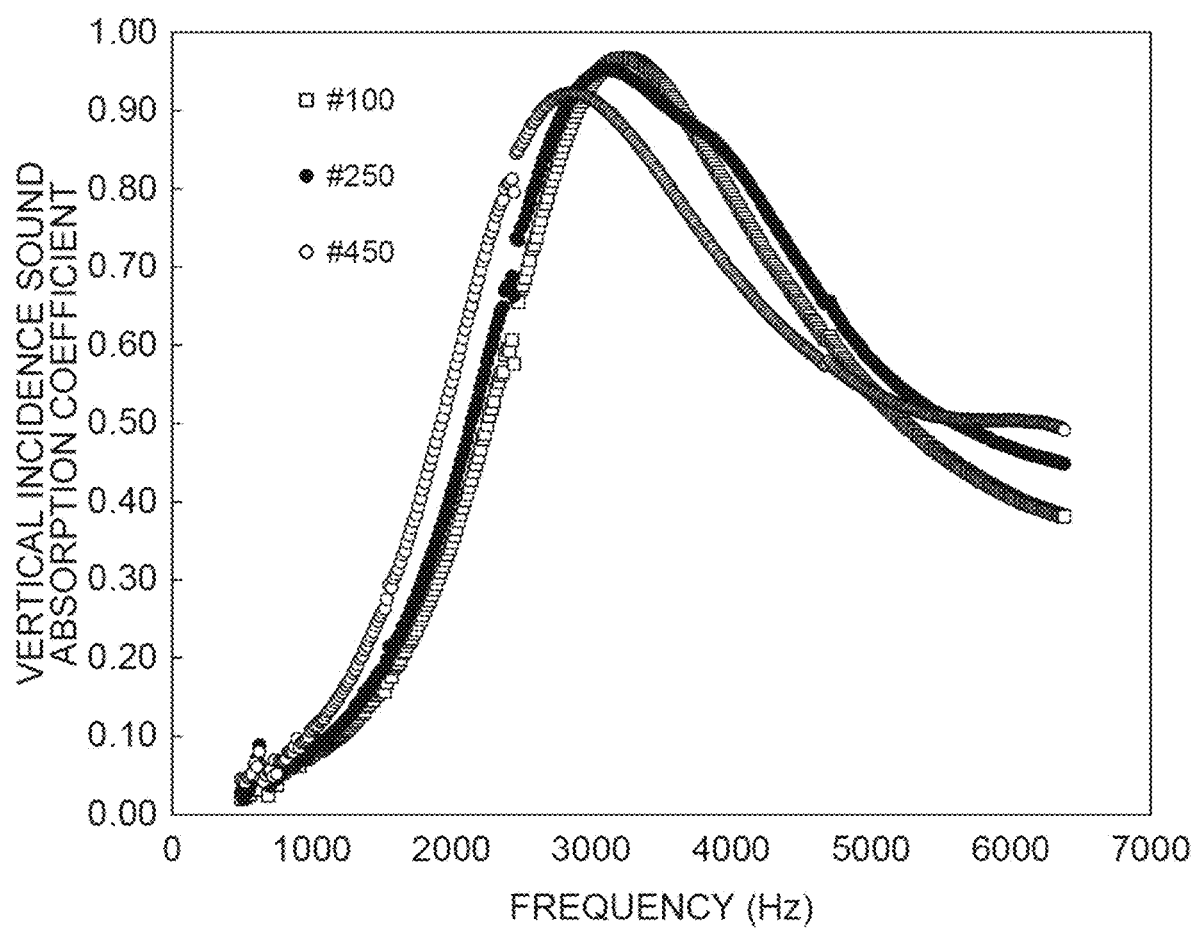
FIG. 10 is an exemplary graph showing a relationship between a frequency of a sound wave with respect to the molded body and a vertical incidence sound absorption coefficient for each resin material of the molded body.

FIG. 10 is a graph showing a relationship between a frequency of a sound wave incident on the molded body 1 that has the cavity portion 2 and the neck portion 3 and a vertical incidence sound absorption coefficient for each material of the molded body 1. A 3D printer device (manufactured by 3D Systems Inc., product name: Projet MJP 5500X) was used for molding the molded body and #100, #250, or #400 (all model numbers) were used as a molding resin. In FIG. 10, the model number "#100" indicates a case where the molded body 1 is constituted by an acrylonitrile butadiene styrene (ABS) resin, and the model numbers "#250" and "#400" indicate a case where the molded body 1 is constituted by a mixture of ABS and elastomer. The model number "#250" and the model number "#400" have different mixing ratios of ABS and elastomer. As shown in FIG. 10, it could be seen that even when the mixing ratio of ABS and elastomer changes, the sound absorption characteristics of molded body 1 does not change significantly. This indicates that in the molded body 1, the sound absorbing characteristics do not change significantly even if the material changes.

Next, the operation and effect of the molded body according to the present embodiment will be described. As illustrated in FIGS. 3 and 4, in the molded body, the plurality of cavity portions 2 are formed inside, and the neck portion 3 is formed in each of the plurality of cavity portions 2. Some of the plurality of neck portions 3 communicate with the surface 1b and/or the cavity portions 2 exposed on the surface 1b. At least some of the plurality of neck portions 3 cause the plurality of cavity portions 2 to communicate with each other. Therefore, when vibration energy including sound waves is incident on the neck portion 3, violent vibration occurs. The cavity portion 2 on a side (a back side) opposite to the surface 1b functions as a spring, and thus the vibrational energy is viscously attenuated. Therefore, high sound absorption performance and vibration absorption performance can be exhibited by the neck portion 3 and the cavity portion 2 that expands on a side of the neck portion 3 opposite to the surface 1b.

In this molded body, the inner surface 3c of the neck portion 3 is formed by the molding material itself. In this case, the incidence of the vibration energy on the cavity portion 2 and the neck portion 3 can be made smoother than in the case where the neck portion 3 is formed by a separate dedicated member (such as the communicating member 100 in FIG. 18). Therefore, sound absorption performance and vibration absorption performance can be improved without increasing the size of the molded body. As a result, it is possible to curb an increase in the size of the molded body.

The molded body may be a foamed body, and the cavity portion 2 may be formed by a cell 42 which is larger than an average diameter of all cells 42 by 100% or more among cells 42 inside the foamed body.

At least some of the neck portions 3 may be formed by the cells 42 inside the foamed body.

At least some of the neck portions 3 may have a shape in which a center line CL1 extends linearly.

In the molded body 1, the neck portion 3 extends from the inner surface 2b defining one cavity portion 2 to an inner surface 2b of another cavity portion 2 adjacent to the one cavity portion 2. Therefore, the neck portion 3 can be formed not to protrude from the inner surface 2b that defines the cavity portion 2, and thus the incidence of the vibration energy on the cavity portion 2 and the neck portion 3 can be made smoother. Therefore, in the molded body 1, sound absorption performance and vibration absorption performance can be improved without increasing the size thereof. As a result, it is possible to curb an increase in the size of the molded body 1.

More specifically, in a case where the protruding portion 54 is formed by the neck portion 3 protruding from the inner surface of the cavity portion 2, a protruding height of the protruding portion 54 with respect to the inner surface 2b of the cavity portion 2 may be 100 μm or less. In this case, the incidence of the vibration energy on the cavity portion 2 and the neck portion 3 can be made smoother.

The material of the cavity portion 2 and the material of the neck portion 3 may be the same. In this case, the molded body 1 can be manufactured with a single material, and thus the molded body 1 can be easily manufactured.

The molded body may be a foamed body, and the cavity portion 2 may be formed by a cell 42 which is larger than an average diameter of all cells 42 by 100% or more among cells 42 inside the foamed body. In this case, the large cell 42 can form the cavity portion 2 having a sufficient size.

At least some of the neck portions 3 may be formed by the cells 42 inside the foamed body. In this case, the neck portion 3 can be easily formed without using a dedicated member or the like for providing the neck portion 3.

At least some of the neck portions 3 may have a shape in which a center line CL1 extends linearly. In this case, the vibration energy can be smoothly incident on the neck portion 3.

In the molded body 1, the ratio of the number of the neck portions 3 to the number of the cavity portions 2 may be 1.1 or more. In this case, by increasing the proportion of the number of the neck portions 3, the frictional action between the vibration including sound waves and the neck portions 3 can be strengthened, and thus the sound wave energy and the vibration energy can be absorbed more efficiently.

The plurality of cavity portions 2 and the plurality of neck portions 3 may constitute the wavelength absorbing unit 10, and the wavelength absorption coefficient of the wavelength absorbing unit 10 at 450 Hz or more and 10000 Hz or less may be 0.4 or more. In this case, the sound wave energy and the vibration energy in a frequency band of 450 Hz or more and 10000 Hz or less can be absorbed with higher efficiency.

The vertical incidence sound absorption coefficient per 10 mm thickness at 450 Hz or more and 10000 Hz or less may be 0.4 or more. In this case, the sound wave energy and the vibration energy in a frequency band of 450 Hz or more and 10000 Hz or less can be absorbed with higher efficiency.

The diameter of the neck portion 3 may be 10 μm or more and 1000 μm or less. In this case, the sound wave energy and the vibration energy in a target frequency band can be absorbed more efficiently.

The volume of the cavity portion 2 may be $4.19 \times 10^9$ μm$^3$ or more and $3.82 \times 10^{11}$ μm$^3$ or less. In this case, the sound wave energy and the vibration energy in a target frequency band can be absorbed more efficiently.

The molded body 1 may contain a urethane foam at least in part. In this case, it is possible to provide the molded body 1 having high flexibility.

The molded body 1 may contain at least one of a thermoplastic resin and a photocurable resin. In this case, the molded body 1 can be manufactured by a 3D printer or the like, and thus the molded body 1 can be manufactured more easily.

The air permeability may be 0.4 cm$^3$/(cm$^2$·s) or more and 200 cm$^3$/(cm$^2$·s) or less. In this case, sound absorption performance and vibration absorption performance can be enhanced, and the desired air permeability can be ensured.

As described above, in the present disclosure, the shape of the molded body can be changed as appropriate. As illustrated in FIG. 11(*a*), the molded body according to the present disclosure may be a rectangular plate-shaped molded body 21. The molded body 21 has, for example, a main surface 22 on which the sound wave or the vibration is incident, one or more (for example, four) side surfaces 23 facing in directions different from that of the main surface 22, and a back surface 24 facing a side opposite to the main surface 22. In this case, the molded body 21 has the main surface 22, the back surface 24 provided to face the main surface 22, and the side surfaces 23 provided between the main surface 22 and the back surface 24. For example, some of the plurality of neck portions 3 may be exposed on the main surface 22 or the above-mentioned cavity portion 2 exposed on the main surface 22.

A thickness T1 of the molded body 21 is, for example, 5 mm or more and 10 mm or less. However, the upper limit of the thickness T1 may be a value other than 10 mm, and the lower limit of the thickness T1 may be a value other than 5 mm. In a case where the thickness T1 is 5 mm or more, the molded body 21 can more effectively absorb the sound wave or the vibration. Further, in the molded body 21 having the cavity portion 2 and the neck portion 3 described above, the sound wave or the vibration can be effectively absorbed even when the thickness T1 is 10 mm or less. Further, when the thickness T1 is 10 mm or less, the size of the molded body 21 can be made more compact.

As illustrated in FIG. 11(*b*), the molded body according to the present disclosure may be a circular plate-shaped molded body 31 that has a main surface 32 on which the sound wave or the vibration is incident, a side surface 33 facing a direction different from that of the main surface 32, and a back surface 34 facing a side opposite to the main surface 32. A thickness T2 of the molded body 31 can be, for example, the same as the thickness T1 of the molded body 21 described above. As described above, the shape and size of the molded body according to the present disclosure can be changed as appropriate.

The sound absorbing material according to the present embodiment may be the molded body 1 described above. Further, the vibration absorbing material according to the present embodiment may be the molded body 1. In this case, it is possible to provide the sound absorbing material or the vibration absorbing material having the same operation and effect as described above.

The embodiments of the molded body, the sound absorbing material, and the vibration absorbing material according to the present disclosure have been described above. However, the present disclosure is not limited to the embodiments described above. The present disclosure can be modified in various ways without changing the gist described in the claims That is, the shape, the size, the number, the material, the function, and the arrangement form of each part of the molded body, the sound absorbing material, and the vibration absorbing material can be changed as appropriate without changing the above gist.

REFERENCE SIGNS LIST 1, 21, 31, 41 Molded body
1*b* Surface
1*c* End surface
1*d* Side surface
1*f* Inside
2 Cavity portion
2*b* Inner surface
3 Neck portion
3*b* Opening
10 Wavelength absorbing unit
22, 32 Main surface
23, 33 Side surface
24, 34 Back surface
42 Cell
54 Protruding portion
θ Angle

The invention claimed is:

1. A molded body comprising:
a plurality of cavity portions formed inside a molding material; and
a plurality of neck portions provided in each of the plurality of cavity portions and configured to communicate with the cavity portions,
wherein some of the plurality of neck portions communicate with a surface and/or the cavity portion exposed on the surface,
wherein at least some of the plurality of neck portions cause the plurality of cavity portions to communicate with each other,
wherein an inner surface of the neck portion is formed by the molding material itself, and wherein a protruding portion is formed by the neck portion, the protruding portion protruding from an inner surface of the cavity portion into the cavity portion, and a protruding height of the protruding portion with respect to the inner surface of the cavity portion is 100 μm or less.

2. The molded body according to claim 1, wherein the cavity portions and the neck portions communicating with the cavity portions are integrally formed by the same molding material.

3. The molded body according to claim 1,
wherein the molded body is a foamed body, and
wherein the cavity portion is formed by a cell which is larger than an average diameter of all cells by 100% or more among cells inside the foamed body.

4. The molded body according to claim 3, wherein at least some of the neck portions are formed by the cells inside the foamed body.

5. The molded body according to claim 1, wherein at least some of the neck portions have a shape in which a center line extends linearly.

6. The molded body according to claim 1,
wherein the plurality of cavity portions and the plurality of neck portions constitute a wavelength absorbing unit, and
wherein a wavelength absorption coefficient of the wavelength absorbing unit at 450 Hz or more and 10000 Hz or less is 0.4 or more.

7. The molded body according to claim 1, wherein a vertical incidence sound absorption coefficient per 10 mm thickness at 450 Hz or more and 10000 Hz or less is 0.4 or more.

8. The molded body according to claim 1, wherein a diameter of the neck portion is 10 μm or more and 1000 μm or less.

9. The molded body according to claim 1, wherein a volume of the cavity portion is $4.19 \times 10^9$ μm$^3$ or more and $3.82 \times 10^{11}$ μm$^3$ or less.

10. The molded body according to claim 1, further comprising:
a main surface;
a back surface provided to face the main surface; and
one or more side surfaces provided between the main surface and the back surface,
wherein some of the plurality of neck portions are exposed on the main surface or the cavity portion exposed on the main surface.

11. A sound absorbing material which is the molded body according to claim 1.

12. A vibration absorbing material which is the molded body according to claim 1.

* * * * *